(12) United States Patent
Vogelaar et al.

(10) Patent No.: US 11,633,727 B2
(45) Date of Patent: Apr. 25, 2023

(54) SUPPORTED HYDROTREATING CATALYSTS HAVING ENHANCED ACTIVITY

(71) Applicant: ALBEMARLE CATALYSTS COMPANY B. V., Amsterdam (NL)

(72) Inventors: Bastiaan Maarten Vogelaar, Hoofddorp (NL); Tjøstil Vlaar, Amsterdam (NL); Viktoria Andreevna Renkema-Krysina, Amsterdam (NL); Vincentius Theodorus Maria Raven, Amsterdam (NL)

(73) Assignee: ALBEMARLE CATALYSTS COMPANY B.V., Amsterdam (NL)

( * ) Notice: Subject to any disclaimer, the term of this patent is extended or adjusted under 35 U.S.C. 154(b) by 0 days.

(21) Appl. No.: 17/520,170

(22) Filed: Nov. 5, 2021

(65) Prior Publication Data
US 2022/0055024 A1 Feb. 24, 2022

Related U.S. Application Data

(63) Continuation-in-part of application No. 14/430,146, filed as application No. PCT/EP2013/070826 on Oct. 7, 2013, now abandoned.
(Continued)

(51) Int. Cl.
*B01J 31/06* (2006.01)
*B01J 21/04* (2006.01)
(Continued)

(52) U.S. Cl.
CPC ............ *B01J 31/06* (2013.01); *B01J 21/04* (2013.01); *B01J 21/063* (2013.01); *B01J 21/08* (2013.01);
(Continued)

(58) Field of Classification Search
CPC . B01J 21/04; B01J 21/063; B01J 21/08; B01J 21/12; B01J 21/19; B01J 31/06;
(Continued)

(56) References Cited

U.S. PATENT DOCUMENTS 2,861,101 A 11/1958 Tousignant et al.
3,755,150 A 8/1973 Mickelson
(Continued)

FOREIGN PATENT DOCUMENTS

EP 1 600 212 A1 11/2005
EP 1 712 277 A1 10/2006
(Continued)

OTHER PUBLICATIONS

Haber, J., et al., "Manual Of Methods And Procedures For Catalyst Characterization", Pure & Appl. Chem., 1995., vol. 67, Nos. 8/9, pp. 1257-1306.
(Continued)

*Primary Examiner* — Brian A McCaig
(74) *Attorney, Agent, or Firm* — Mary H. Drabnis; Phelps Dunbar LLP

(57) ABSTRACT

This invention provides supported catalysts comprising a carrier, phosphorus, at least one Group VI metal, at least one Group VIII metal, and a polymer. In the supported catalyst, the molar ratio of phosphorus to Group VI metal is about 1:1.5 to less than about 1:12, the molar ratio of the Group VI metal to the Group VIII metal is about 1:1 to about 5:1, and the polymer has a carbon backbone and comprises an amido group. Also provided are a process for preparing such supported catalysts, as well as methods for hydrotreating, hydrodenitrogenation, and/or hydrodesulfurization, using supported catalysts.

26 Claims, 12 Drawing Sheets

Related U.S. Application Data

(60) Provisional application No. 61/712,108, filed on Oct. 10, 2012.

(51) Int. Cl.

| | | |
|---|---|---|
| *C08F 220/58* | (2006.01) | |
| *B01J 27/19* | (2006.01) | |
| *B01J 21/06* | (2006.01) | |
| *B01J 21/08* | (2006.01) | |
| *C10G 45/00* | (2006.01) | |
| *B01J 37/08* | (2006.01) | |
| *B01J 37/02* | (2006.01) | |
| *B01J 37/04* | (2006.01) | |
| *B01J 37/20* | (2006.01) | |
| *B01J 35/02* | (2006.01) | |
| *C10G 45/08* | (2006.01) | |
| *B01J 21/12* | (2006.01) | |

(52) U.S. Cl.
CPC ............. *B01J 21/12* (2013.01); *B01J 27/19* (2013.01); *B01J 35/023* (2013.01); *B01J 37/0207* (2013.01); *B01J 37/04* (2013.01); *B01J 37/082* (2013.01); *B01J 37/20* (2013.01); *C08F 220/58* (2013.01); *C10G 45/00* (2013.01); *C10G 45/08* (2013.01)

(58) Field of Classification Search
CPC .... B01J 35/002; B01J 35/023; B01J 37/0207; B01J 37/04; B01J 37/082; B01J 37/20; C08F 220/58; C08L 33/26; C10G 45/00; C10G 45/08

See application file for complete search history.

(56) References Cited

U.S. PATENT DOCUMENTS

| | | | |
|---|---|---|---|
| 3,872,030 | A | 3/1975 | Feins et al. |
| 3,904,685 | A | 9/1975 | Shahidi et al. |
| 3,992,324 | A | 11/1976 | Andre et al. |
| 3,993,592 | A | 11/1976 | Van Thillo et al. |
| 4,225,421 | A | 9/1980 | Hensley, Jr. et al. |
| 4,358,396 | A | 11/1982 | Bernstein et al. |
| 4,698,404 | A | 10/1987 | Cramm et al. |
| 5,232,888 | A | 8/1993 | Kamo |
| 5,990,245 | A | 11/1999 | Esselborn et al. |
| 6,280,610 | B1 | 8/2001 | Uragami et al. |
| 6,294,498 | B1 | 9/2001 | Darcissac et al. |
| 6,310,156 | B1 | 10/2001 | Maeda et al. |
| 6,989,348 | B2 | 1/2006 | Eijsbouts |
| 7,514,476 | B2 | 4/2009 | Parasher et al. |
| 7,534,741 | B2 | 5/2009 | Wu et al. |
| 7,541,309 | B2 | 6/2009 | Trevino et al. |
| 7,563,742 | B2 | 7/2009 | Reyes et al. |
| 7,718,710 | B2 | 5/2010 | Zhang et al. |
| 2002/0010089 | A1 | 1/2002 | Eijsbouts |
| 2002/0013223 | A1 | 1/2002 | Eijsbouts et al. |
| 2005/0014635 | A1 | 1/2005 | Zhou et al. |
| 2005/0261125 | A1 | 11/2005 | Sagae |
| 2005/0266985 | A1 | 12/2005 | Iwata |
| 2008/0119353 | A1 | 5/2008 | Jia et al. |
| 2008/0194892 | A1 | 8/2008 | Cholley et al. |
| 2009/0107883 | A1 | 4/2009 | Maesen et al. |
| 2010/0105540 | A1 | 4/2010 | Galliou et al. |
| 2010/0133148 | A1 | 6/2010 | Timmler et al. |
| 2012/0037540 | A1 | 2/2012 | Jansen et al. |
| 2013/0186806 | A1 | 7/2013 | Diehl et al. |

FOREIGN PATENT DOCUMENTS

| | | |
|---|---|---|
| FR | 2 451 221 | 10/1980 |
| GB | 2 150 852 A | 7/1985 |
| WO | 1999/48975 A1 | 9/1999 |
| WO | 2006/046254 A1 | 5/2006 |
| WO | 2010/121807 A1 | 10/2010 |
| WO | 2011/023668 A2 | 3/2011 |
| WO | 2012/022850 A2 | 2/2012 |
| WO | 2012/042479 A1 | 4/2012 |

OTHER PUBLICATIONS

Liu, L., et al., "Investigation of small molecular weight poly( acrylic acid) adsorption on -y-alumina", Applied Surface Science, 2015, vol. 345, pp. 116-121.

Wang, B., et al., "Formation of poly(acrylic acid)/alumina composite via in situ polymerization of acrylic acid adsorbed within oxide pores", Colloids and Surfaces, A: Physiochemical and Engineering Aspects, 2017, vol. 514, pp. 168-177.

Zaman, A., et al., "Adsorption of a Low-Molecular-Weight Polyacrylic Acid on Silica, Alumina, and Kaolin", Journal of Colloid and Interface Science, 2002, vol. 256, pp. 73-78.

Block, P.A. et al., "Novel Activation Technologies for Sodium Persulfate In Situ Chemical Oxidation", Preprint: Proceedings of the Fourth International Conference on the Remediation of Chlorinated and Recalcitrant Compounds, 2004, 8 pages.

Chibowski, Stanislaw, et al., "Polyacrylic Acid (PAA) Adsorption on Alumina (Al2O3) Surface. Influence of Sodium Dodecyl Sulfide (SDS) on Adsorption in PAA-SDS-Al2O3 System", Physicochemical Problems of Mineral Processing, 2006, vol. 40, pp. 175-184.

Li, Zhonghui, et al., "A hybrid supported nickel catalyst for the controlled radical polymerization of methyl methacrylate", Applied Catalysis A: General, 2005, 292, pp. 61-67.

Murli, C., et al., "Pressure-Induced Polymerization of Acrylic Acid: A Raman Spectroscopic Study", J. Phys. Chem. B, 2010, 114, pp. 9744-9750.

Rivas, B.L., et al., "Poly(acrylic acid-co-vinylsulfonic acid): Synthesis, characterization, and Properties as Polychelatogen", Journal of Applied Polymer Science, 2003, vol. 88, pp. 1698-1704.

Rivas, B.L., et al., "Polymer-metal complexes: Synthesis, characterization, and properties of poly(maleic acid) metal complexes with Cu(II), Co(II), Ni(II), and Zn(II)", Polymer Bulletin 2000, 44, pp. 445-452.

Yang, C. Q., et al., "Polymerization of Maleic Acid and Itaconic Acid Studied by FT-Raman Spectroscopy", Journal of Applied Polymer Science, 2001, vol. 81, pp. 223-228.

Das, K. K., et al., "Ultra-low dosage flocculation of alumina using polyacrylic acid", Colloids and Surfaces, A: Physicochemical and Engineering Aspects, 2001,182, pp. 25-33.

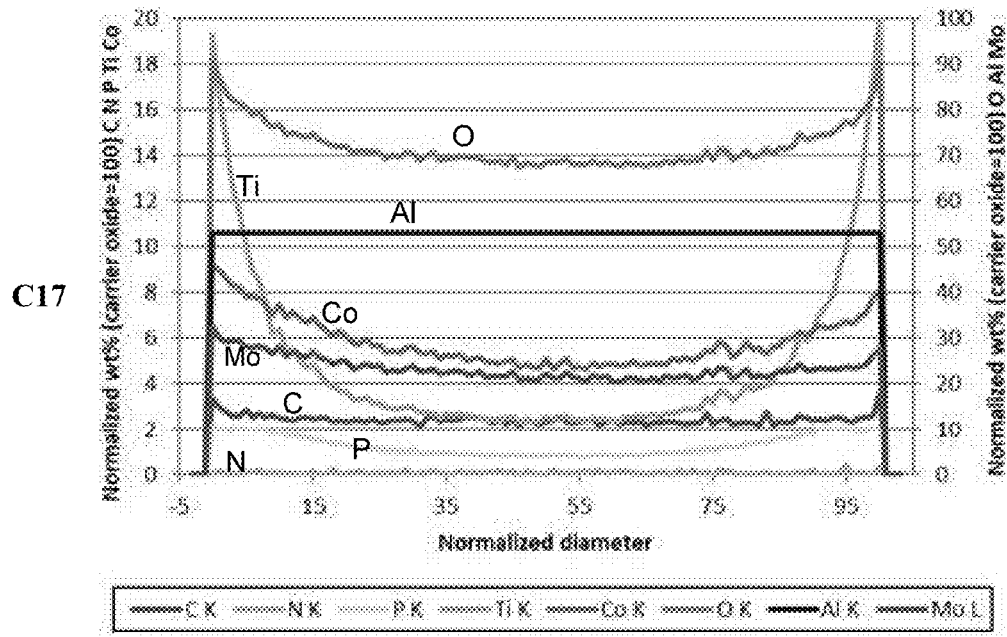
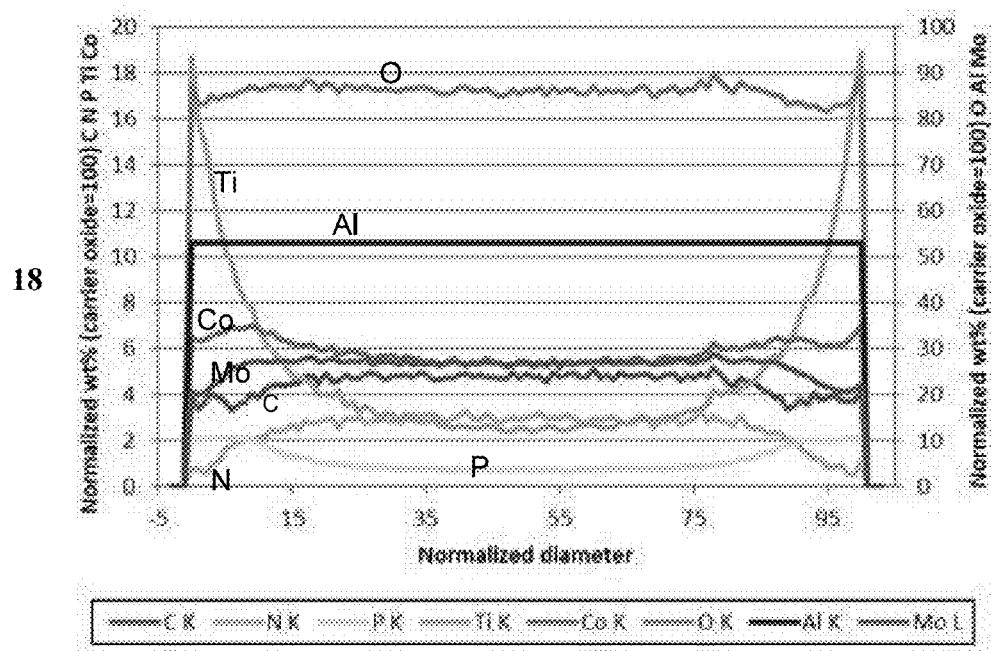
Fig. 3-6

SUPPORTED HYDROTREATING CATALYSTS HAVING ENHANCED ACTIVITY

REFERENCE TO RELATED APPLICATIONS

This application is a Continuation-in-Part of commonly-owned U.S. application Ser. No. 14/430,146, filed Mar. 20, 2015, which is the National Stage of International Patent Appl. No. PCT/EP2013/070826, filed on Oct. 7, 2013, which in turn claims the benefit of U.S. Provisional Patent Appl. No. 61/712,108, filed on Oct. 10, 2012, the disclosures of which are incorporated herein by reference.

TECHNICAL FIELD

This invention relates to supported catalysts formed from concentrated solutions comprising a Group VI metal, a Group VIII metal, and phosphorus.

BACKGROUND

A variety of catalysts for hydrotreating, hydrodesulfurization, and/or hydrodenitrogenation are known and/or are commercially available. Many of these catalysts, some of which contain molybdenum, nickel or cobalt, and phosphorus, are supported on carriers, and are usually prepared by pore volume impregnation. The art continually strives to make different and better catalysts, especially with higher activities for hydrotreating, hydrodesulfurization, and/or hydrodenitrogenation.

Hydroprocessing catalysts are typically prepared by impregnation of a porous carrier material with a solution containing active metals, followed by either drying or calcination. Calcined catalysts tend to exhibit a strong metal-support interaction, which results in a high metal dispersion. However, it is theorized that strong metal-support interaction in calcined catalysts results in a lower intrinsic activity of the catalyst. Non-calcined catalysts typically show a low metal-support interaction and an intrinsically high activity. Due to the low metal-support interaction in non-calcined catalysts, the metals tend to aggregate (poor metal dispersion).

SUMMARY OF THE INVENTION

This invention provides processes for preparing supported catalysts from concentrated solutions comprising Group VI metal, Group VIII metal, and phosphorus, and catalysts prepared by such processes. Catalysts prepared according to the invention exhibit high activity in hydrodesulfurization and hydrodenitrification. It has been suggested that in the catalysts of the invention, which are polymer-modified, the hydrogenation metals are more dispersed than in similar catalysts in absence of polymer modification.

Chelating polymers can be synthesized in the pore structure of a carrier material (e.g. an inorganic oxide) in the presence of metals (e.g. Co, Ni, Mo). The presence of these chelating polymers enhances the activity of hydroprocessing catalysts compared to catalysts that do not contain polymers. Both the hydrodesulfurization and the hydrodenitrogenation activities are increased relative to catalysts that do not contain polymers, which makes catalysts of the invention useful in various hydrotreating applications including, but not limited to, hydrocarbon cracking pretreatment (HC-PT), fluid catalytic cracking pretreatment (FCC-PT), and ultra-low sulfur diesel (ULSD).

An embodiment of this invention is a supported catalyst. The supported catalyst comprises a carrier, phosphorus, at least one Group VI metal, at least one Group VIII metal, and a polymer. In the catalyst, the molar ratio of phosphorus to Group VI metal is about 1:1.5 to less than about 1:12, the molar ratio of the Group VI metal to the Group VIII metal is about 1:1 to about 5:1. The polymer in the catalyst has a carbon backbone and comprises an amido group.

Other embodiments of this invention include processes for forming the just-described supported catalysts, as well as methods for hydrotreating, hydrodenitrogenation, and/or hydrodesulfurization, using the just-described supported catalysts.

These and other embodiments and features of this invention will be still further apparent from the ensuing description, drawings, and appended claims.

BRIEF DESCRIPTION OF THE DRAWINGS

FIGS. 3-1 to 3-6 show SEM-EDX linescans of samples prepared as in Examples 9 and 10.

FIGS. 4-1 to 4-5 show cross sections from SEM-EDX measurements of catalyst particles prepared as in Examples 14 and 15.

FIG. 5 shows zoomed-in (enlarged) cross sections from SEM-EDX measurements of catalyst particles prepared as in Example 15.

FURTHER DETAILED DESCRIPTION OF THE INVENTION

Figure 1:
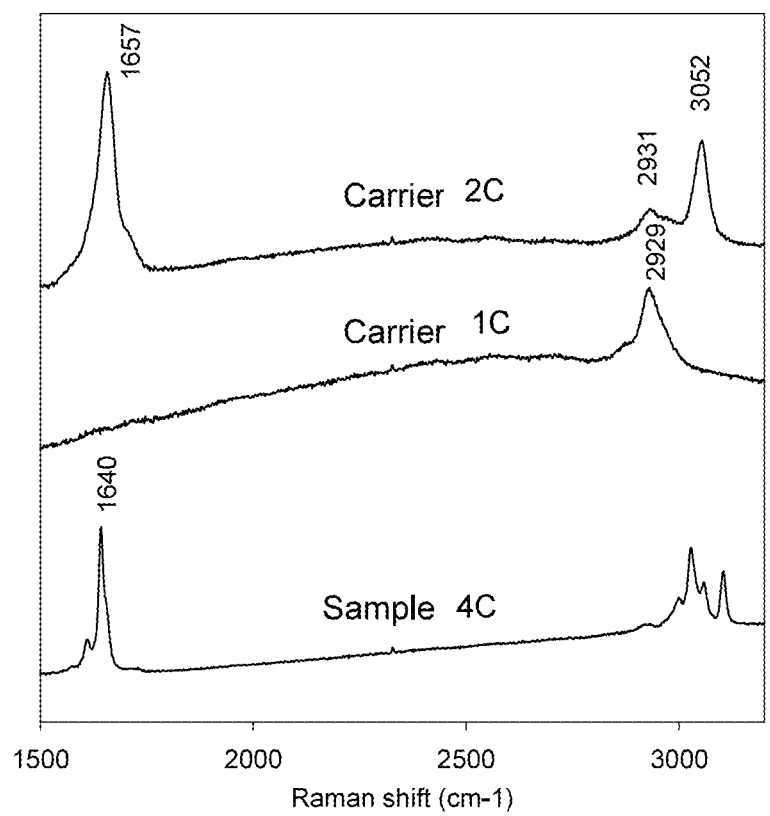
FIG. 1 shows Raman spectra providing evidence of polymerization in some of the samples prepared in Examples 1 and 2.

Throughout this document, the phrases "hydrogenation metal" and "hydrogenation metals" refer to the Group VI metal or metals and the Group VIII metal or metals collectively. As used throughout this document, the term "Group VI metal" refers to the metals of Group VIB. As used throughout this document, the phrases "as the Group VI metal trioxide," "reported as the Group VI metal trioxide," "calculated as the Group VI metal trioxide," "expressed as their oxides," and analogous phrases for the Group VIII metals as their monoxides and phosphorus as phosphorus pentoxide ($P_2O_5$) refer to the amount or concentration of Group VI metal, Group VIII metal, or phosphorus, where the numerical value is for the respective oxide, unless otherwise noted. For example, nickel carbonate may be used, but the amount of nickel is stated as the value for nickel oxide.

As used throughout this document, the term "impregnation" when referring to impregnation of a carrier, means that the substance, solution, or mixture penetrates into the pores of the carrier.

The impregnation solutions used in the practice of this invention comprise a solvent, phosphorus, at least one Group VI metal, and at least one Group VIII metal, where the molar ratio of phosphorus to Group VI metal is about 1:1.5 to less than about 1:12, and where the molar ratio of the Group VI metal to the Group VIII metal is about 1:1 to about 5:1.

The Group VI metal is molybdenum, tungsten, and/or chromium; preferably molybdenum or tungsten, more preferably molybdenum. The Group VIII metal is iron, nickel and/or cobalt, preferably nickel and/or cobalt. Preferred combinations of metals include a combination of nickel and/or cobalt and molybdenum and/or tungsten. When hydrodesulfurization activity of the catalyst is to be emphasized, a combination of cobalt and molybdenum is advantageous and preferred. When hydrodenitrogenation activity of the catalyst is to be emphasized, a combination of nickel and molybdenum and/or tungsten is advantageous and preferred. Another preferred combination of hydrogenation metals is nickel, cobalt and molybdenum.

The Group VI metal compound used to prepare the impregnation solution can be an oxide, an oxo-acid, or an ammonium salt of an oxo or polyoxo anion; these Group VI metal compounds are formally in the +6 oxidation state when the metal is molybdenum or tungsten. Oxides and oxo-acids are preferred Group VI metal compounds. Suitable Group VI metal compounds in the practice of this invention include chromium(III) oxide, ammonium chromate, ammonium dichromate, molybdenum trioxide, molybdic acid, ammonium molybdate, ammonium paramolybdate, tungsten trioxide, tungstic acid, ammonium metatungstate hydrate, ammonium para-tungstate, and the like. Preferred Group VI metal compounds include chromium(III) oxide, molybdenum trioxide, molybdic acid, ammonium para-tungstate, tungsten trioxide and tungstic acid. Combinations of any two or more Group VI metal compounds can be used.

The Group VIII metal compound used to prepare the impregnation solution is usually an oxide, carbonate, hydroxide, hydroxy-carbonate, or a salt. Suitable Group VIII metal compounds include, but are not limited to, iron oxide, iron hydroxide, iron nitrate, iron carbonate, iron hydroxy-carbonate, iron acetate, iron citrate, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include iron hydroxide, iron carbonate, iron hydroxy-carbonate, cobalt hydroxide, cobalt carbonate, cobalt hydroxy-carbonate, nickel hydroxide, nickel carbonate, and nickel hydroxy-carbonate. Combinations of two or more Group VIII metal compounds can be used.

In the practice of this invention, the phosphorus compound is soluble, usually in a polar solvent, and is typically an acidic phosphorus compound, preferably a water soluble acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates. A combination of two or more different phosphorus compounds can be used. The phosphorus compound(s) may be used in liquid or solid form. In some embodiments, the phosphorus compound is preferably a water-soluble compound. A preferred phosphorus compound is orthophosphoric acid ($H_3PO_4$).

One or more organic additives are optionally included, and may be a non-acidic organic additive and/or an acidic organic additive.

For the non-acidic organic additive, the term "non-acidic" as used throughout this document means that no acidic carboxylic groups are present in the additive. Non-acidic organic additives normally include compounds having at least two hydroxyl groups and two to about ten carbon atoms, and the (poly)ethers of these compounds. Some preferred, non-acidic organic additives have two hydroxyl groups. Suitable types of compounds for the non-acidic organic additive include aliphatic alcohols, ethers, including ethers of aliphatic alcohols, polyethers, saccharides, including monosaccharides and disaccharides, and polysaccharides. Examples of such compounds include, but are not limited to, glycerin, trimethylol ethane, trimethylol propane, ethylene glycol, diethylene glycol, trimethylene glycol, triethylene glycol, tributylene glycol, tetraethylene glycol, tetrapentylene glycol, propylene glycol, dipropylene glycol, ethylene glycol monobutyl ether, diethylene glycol monomethyl ether, diethylene glycol monoethyl ether, diethylene glycol monopropyl ether, diethylene glycol monobutyl ether, glucose, fructose, lactose, maltose, and saccharose. Preferred non-acidic organic additives include glycols such as diethylene glycol, triethylene glycol, and tetraethylene glycol. A combination of two or more organic additives can be used, if desired.

The optional acidic organic additive has at least one acid group and at least one functional group selected from a hydroxyl group and an acid group. Thus, at a minimum, the acidic organic additive has one acid group and one hydroxyl group, or two acid groups. As used herein, the term "acid group" means the —COOH moiety. The acidic organic additive preferably has at least two carboxylic acid moieties, and preferably has at least about three carbon atoms. It is sometimes preferred that the acidic organic additive has at least one hydroxyl group. Suitable acidic organic additives include citric acid, gluconic acid, lactic acid, malic acid, maleic acid, malonic acid, oxalic acid, tartaric acid, and the like. Citric acid is a preferred acidic organic additive. Combinations of acidic organic additives can be used.

To dissolve the Group VI metal compound and the Group VIII metal compound, a polar solvent is usually needed. In this invention, the polar solvent can be protic or aprotic, and is generally a polar organic solvent and/or water. Mixtures of polar solvents can be used, including mixtures comprising an aprotic solvent and a protic solvent. Suitable polar solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, and mixtures thereof. Preferably, the polar solvent is a protic solvent; more preferably, the polar solvent is water or an alcohol, such as ethanol or isopropyl alcohol. Mixtures of two or more polar solvents can be used. Water is a preferred polar solvent.

When a monomer and a carrier are brought together and the monomer is polymerized before being contacted with an impregnation solution (a solution containing the Group VI metal compound, Group VIII metal compound, and phosphorus), the monomer can be polymerized in any solvent in which the monomer is soluble, including nonpolar solvents. After the polymerization, the solvent can be removed. When a monomer and a carrier are brought together and the monomer is polymerized before being contacted with an impregnation solution, removal of at least a portion of the solvent is preferred, especially when the solvent for polymerization will negatively affect the solubility of the Group VI metal compound, Group VIII metal compound, and/or phosphorus compound. Suitable solvents for the polymerization in the absence of the Group VI metal compound, Group VIII metal compound, and phosphorus depend on the solubility of the monomer(s) employed. The solvent(s) used in the polymerization step can be present in the solution with the Group VI metal compound, Group VIII metal compound, and phosphorus to the extent that the solvent(s) from the polymerization step do not cause the metal salts and/or the phosphorus compound to precipitate.

When an impregnation solution and a carrier are brought together to form an impregnated carrier prior to contact with the monomer, the monomer may be dissolved in a solvent that may be the same or different than the solvent of the impregnation solution. Solvent(s) for the monomer depend on the solubility of the monomer(s) employed. It is preferred to employ the same solvent to dissolve the monomer and to form the impregnation solution, although different solvents can be used if desired.

Solvents that form impregnation solutions must be able to dissolve the phosphorus compounds, Group VI metal compounds, and Group VIII metal compounds that are used in forming the impregnation solutions used in the practice of this invention; such solvents are typically polar solvents.

When a monomer species and at least one phosphorus compound, at least one Group VI metal compound, at least one Group VIII metal compound are brought together prior to polymerization, the monomer species should be soluble in the solution containing phosphorus, at least one Group VI metal compound, and at least one Group VIII metal compound. When an impregnation solution is brought into contact with the carrier and monomer species during polymerization, the same solubility considerations apply; namely, that the monomer species present should be soluble in the solution in the presence of the at least one phosphorus compound, at least one Group VI metal compound, and at least one Group VIII metal compound. Often, for the monomer to be soluble in the solution containing the at least one phosphorus compound, at least one Group VI metal compound, at least one Group VIII metal compound, the monomer is at least somewhat soluble in the polar solvent in which the at least one phosphorus compound, at least one Group VI metal compound, at least one Group VIII metal compound are dissolved.

Throughout this document, the term "monomer" is synonymous with the phrase "monomer species." The monomer species has carbon-carbon unsaturation as the polymerizable moiety, and an amido group. It is theorized that the heteroatom(s) may form a bond or interaction with a metal ion, though formation of bonds or interactions is not required. In addition to the amido group, the monomer may contain another functional group comprising at least one heteroatom. When present, the functional group comprises nitrogen, oxygen, or both nitrogen and oxygen. Examples of suitable functional groups include hydroxyl groups, carboxyl groups, carbonyl groups, alkoxy groups such methoxy and ethoxy, amino groups, nitrile groups, amino acid groups, and the like. Preferred functional groups include hydroxyl groups.

Suitable monomer species include acrylamides such as acrylamide, methacrylamide, N-isopropylacrylamide, N-hydroxymethyl acrylamide, N-hydroxyethyl acrylamide, N-methoxymethyl acrylamide, N-ethoxymethyl acrylamide, and the like. Preferred monomer species include acrylamide and N-hydroxyethyl acrylamide; more preferred is acrylamide. Two or more monomer species can be employed; when two or more monomer species are employed, co-polymers will be formed.

The amount of monomer used to form the catalysts of this invention is expressed as wt % relative to the total weight of the carrier, Group VI metal compound, Group VIII metal compound, and phosphorus compound, where the Group VI metal compound, Group VIII metal compound, and phosphorus compound are expressed as their Group VI metal and Group VIII metal oxides, and phosphorus is also expressed as its oxide; the weight of any solvent is excluded. As used throughout this document, the phrases "other components used to form the catalyst" and "other catalyst components" refer to the carrier and the chemical substances that provide the hydrogenation metals and phosphorus to the catalyst. For example, if the total weight of the other components of the catalyst (other than the solvent) is 100 grams, 10 wt % of monomer is 10 grams. In the practice of this invention, the amount of monomer is generally about 1.5 wt % or more, preferably in the range of about 1.5 wt % to about 35 wt %, relative to the total weight of the other components of the catalyst excluding the solvent, although amounts outside these ranges are within the scope of the invention. More preferably, the amount of monomer is in the range of about 3 wt % to about 30 wt %, even more preferably in the range of about 5 wt % to about 25 wt %, still more preferably in the range of about 10 wt % to about 21 wt %, relative to the total weight of the other components of the catalyst.

An inhibitor (e.g., a radical scavenger) can be included with the monomer to prevent premature polymerization of the monomer species. Suitable inhibitors will vary with the particular monomer(s). Appropriate inhibitors will not have an adverse effect on the at least one phosphorus compound, at least one Group VI metal compound, and at least one Group VIII metal compound, when present in the mixture before polymerization is initiated. Desirably, the inhibitor is neutralized or removed (e.g., by evaporation or introduction of an initiator) when it is desired to start the polymerization reaction.

Although the components used in forming an impregnation solution can be combined in any order, it is recommended and preferred that one component is suspended or dissolved in the solvent prior to the introduction of the other components. Preferably, the Group VIII metal compound is introduced first; more preferably, the Group VI metal compound is introduced after the Group VIII metal compound. The phosphorus compound may be introduced at any point, but preferably is introduced after the Group VI compound and the Group VIII compound have been introduced. Stirring may be employed when forming the solution, but can be stopped once the solution is homogeneous. Similar considerations apply when a monomer and at least one phosphorus compound, at least one Group VI metal compound, and at least one Group VIII metal compound are brought together; it is preferable to combine the compounds of the hydrogenation metals with the solvent, usually a polar solvent, then add the phosphorus compound, followed by the monomer.

Combining of the components of an impregnation solution can be done at ambient conditions, i.e., room temperature and ambient pressure. Elevated temperatures are sometimes necessary to assist in the dissolution of the components, particularly the Group VI compound and the Group VIII compound. Such elevated temperatures are typically in the range of about 50° C. to about 95° C., preferably about 60° C. to about 95° C. Temperatures in excess of about 95° C. and/or elevated pressures can be applied (e.g., hydrothermal preparation), but are not required. If a monomer for which polymerization is thermally initiated is to be included in the solution, either the temperature to which the solution is heated is kept below the temperature at which polymerization is initiated, or, preferably, the monomer species is added after any heating of the solution is completed.

It is convenient to prepare solutions having concentrations that are practical for further intended use of the solution. These solutions can be employed, as embodied in this invention, to form a supported catalyst. Suitable concentrations based on the Group VI metal (or total thereof, if more than one Group VI metal is present in the composition), are typically in the range of about 1.39 mol/L to about 6 mol/L, preferably in the range of about 2.1 mol/L to about 4.2 mol/L. Methods for preparing more-concentrated impregnation solutions are known, and are described for example in International Publication No. WO 2011/023668.

The impregnation solutions for the invention, formed as described above, are solutions comprising a Group VI metal, a Group VIII metal, and phosphorus, in a polar solvent. The concentrations of the Group VI metal, Group VIII metal, phosphorus and, and the preferences therefor are as described above. In these solutions, the molar ratio of phosphorus to Group VI metal is about 1:1.5 to less than about 1:12, preferably about 1:2.5 to less than about 1:12, more preferably about 1:3 to less than about 1:12, and the molar ratio of the Group VI metal to the Group VIII metal is about 1:1 to about 5:1.

Without wishing to be bound by theory, a mixture of species is believed to be present in the impregnation solutions for this invention. At this time, not all of the species are well characterized. In this connection, for examples of species present in solutions containing molybdenum and phosphorus, see J. Bergwerff, Ph.D. thesis, Utrecht University, The Netherlands, 2007, Chapter 2C.

When combinations of reagents are used in forming the solutions, as mentioned above, a mixture of species having different metals will be present in the solution. For example, if a molybdenum compound and a tungsten compound are used, the product solution will include molybdenum and tungsten. In another example, if a cobalt compound and a nickel compound are used, the solution will include cobalt and nickel. Mixtures of reagents such that Group VI metal compounds in which the Group VI metals of the compounds are different and Group VIII metal compounds in which the Group VIII metals of the compounds are different can be used in forming the solution compositions if desired.

The processes of the invention for forming catalysts comprise I) bringing together a carrier, one or more monomer species, a solvent, at least one phosphorus compound, at least one Group VI metal compound, and at least one Group VIII metal compound, in any of the following combinations:

a) a carrier, one or more monomer species, and a solvent,
b) a carrier, one or more monomer species, at least one phosphorus compound, at least one Group VI metal compound, and at least one Group VIII metal compound, or
c) a carrier and an impregnation solution, forming an impregnated carrier, followed by mixing the impregnated carrier with one or more monomer species, to form a monomer-containing mixture, where said monomer species is soluble in the solvent, and has carbon-carbon unsaturation and at least one functional group comprising at least one heteroatom. When the polymerization initiator is a chemical substance, the initiator can be included with any of the combinations a), b), and c) above in Step I). Step II) comprises initiating polymerization of the monomer species in the monomer-containing mixture to form a polymerized product. Step III) is performed when the monomer-containing mixture in I) is formed as in a), and comprises either A) contacting an impregnation solution and the monomer-containing mixture during the polymerization in II), or
B) contacting the polymerized product and an impregnation solution.

A supported catalyst is formed. In the processes, the molar ratio of phosphorus to Group VI metal is about 1:1.5 to less than about 1:12, where the molar ratio of the Group VI metal to the Group VIII metal is about 1:1 to about 5:1. Impregnation solutions employed in the process comprise a polar solvent, phosphorus, at least one Group VI metal, and at least one Group VIII metal. Removing excess solvent from the supported catalyst, e.g., by drying, is a recommended further step.

A feature of this invention is that there is little or no aggregation of carrier particles in the processes of the invention for forming catalysts. In other words, the catalyst particles produced are generally free-flowing and do not adhere to each other. Another feature of this invention is that the carrier particles are unaltered in size and shape by the processes of the invention for forming catalysts. For example, carrier particles with an average particle size of about 2 mm become catalyst particles with an average particle size of about 2 mm.

In the processes of the invention for forming catalysts, all of the components in the impregnation solution must be dissolved before initiating the impregnation step. When at least one phosphorus compound, at least one Group VI metal compound, and at least one Group VIII metal compound form part of the monomer-containing mixture, the monomer species is preferably combined with the mixture after any heating of the mixture is finished. For monomers of thermally-initiated polymerizations, the temperature during formation of the monomer-containing mixtures are kept below the initiation temperature for polymerization.

Because polymerization reactions are usually exothermic, the reaction vessel should be heat resistant at least to the temperatures reached by the polymerization reaction.

In preferred embodiments, the process comprises forming an impregnation solution of a phosphorus compound, a Group VI metal compound, and a Group VIII metal compound in a polar solvent, adding a heat-activated chemical substance initiator and then the carrier to the impregnation solution, followed by aging the mixture of the impregnation solution and the carrier for a period of time, e.g., 0.5 to 10 hours at low heat (e.g., 30° C. to 60° C.) to promote the impregnation solution into the pores of the carrier. After aging, the mixture is preferably heated at one or more temperatures at which the chemical substance initiator starts the polymerization reaction. Generally, the temperature(s) chosen are at or slightly above the temperature needed to initiate the polymerization. Control of heat release during the polymerization is recommended to avoid driving a portion of the impregnation solution out of the carrier pores, which reduces the amount of Group VI metal, Group VIII metal, and phosphorus in the final catalyst. The polymerization reaction can be monitored via the exotherm produced. When the polymerization reaction is over, the product preferably is dried to remove the solvent(s). At atmospheric pressure, drying (solvent removal) is preferably at a temperature of about 25° C. to about 200° C., more preferably about 50° C. to about 150° C., even more preferably about 75° C. to about 125° C. Reduced pressure and/or vacuum conditions can be used for drying. The drying temperature(s) should be lower than the decomposition temperature of the polymer; the decomposition temperature of the polymer may vary with one or more of the catalyst features (carrier, Group VI metal, Group VIII metal, phosphorus, and/or amounts thereof).

The monomer-containing mixture includes at least one carrier and at least one monomer species. At least one phosphorus compound, at least one Group VI metal compound, and at least one Group VIII metal compound, or an impregnation solution are optionally included with the carrier and one or more monomer species in forming the monomer-containing mixture. Inclusion of at least one phosphorus compound, at least one Group VI metal compound, and at least one Group VIII metal compound (sometimes as an impregnation solution) in the monomer-containing mixture is recommended and preferred. When at least one phosphorus compound, at least one Group VI metal compound, and at least one Group VIII metal compound are not included in the monomer-containing mixture, an impregnation solution can be mixed with the polymerized product of the monomer-containing solution; alternatively, an impregnation solution can be brought into contact with the monomer-containing mixture during polymerization.

In the processes of this invention, the polymerization of the monomer species to form the polymer typically employs at least one initiator. Initiators include heat, radiation (e.g., UV), chemical substances, and combinations of these. When the initiator is a chemical substance, it usually remains with the supported catalyst, and may affect catalyst performance. Thus, when more than one initiator can be chosen, it may be useful to run tests to determine which combination of initiator(s) and selected monomer(s) allows for optimal catalyst performance. Another consideration is that the selected initiator(s) and monomer(s) should not adversely affect the solubility of the phosphorus, Group VI metal, and/or Group VIII metal compounds in the impregnation solution (e.g., by causing precipitation). For example, in the polymerization of acrylic acid with persulfate salts as initiators, it was found that potassium persulfate was a better initiator than ammonium persulfate for a catalyst containing nickel, molybdenum, and phosphorus (see International Publication No. WO 2014/056846). In polymerizations of acrylamide, potassium persulfate and ammonium persulfate are preferred initiators. The effect of a particular initiator may vary with the concentration of hydrogenation metals present in the catalyst, the monomer, and the conditions under which catalysis is performed.

When the initiator is a chemical substance (or a chemical substance in combination with heat or radiation), any suitable chemical substance initiator that initiates polymerization of the monomer, and does not adversely affect the solubility of the monomer, phosphorus, Group VI metal, and/or Group VIII metal compounds present in the solution, can be used. Preferred initiators include persulfate salts, such as sodium persulfate, potassium persulfate, and ammonium persulfate; more preferred are potassium persulfate and ammonium persulfate. Hydrogen peroxide is a suitable initiator, but must be used in larger amounts relative to the monomer as compared to persulfate salts, at least when the monomer is acrylamide. Further, it has been found that the carrier has an effect on the polymerization when the initiator is hydrogen peroxide, with polymerization observed when alumina or titania is the carrier. Polymerization is not observed with hydrogen peroxide as the initiator when silica or a combination of alumina and silica is the carrier. Preferably, when the initiator is hydrogen peroxide, the carrier is alumina, titania, or alumina containing titania, more preferably alumina.

Suitable initiators also depend on the (polymerization) reactivity of the selected monomer(s). For example, ammonium persulfate or potassium persulfate in combination with an increase in temperature from room temperature to 80° C. is a suitable combination of initiators for polymerization of acrylamide. However, for monomers that polymerize less readily, a different type of initiator or a different combination of initiators may be required.

The amount of a chemical substance initiator that provides a high yield of polymer can vary with the initiator, monomer, metals, and carrier. It has been found that persulfate salts are preferably about 1.25 mmol or more, or about 1.25 mmol to about 3 mmol, per mole of monomer, more preferably about 1.5 mmol or more, or about 1.5 mmol to about 2.75 mmol, per mole of monomer, especially when the monomer is acrylamide. In terms of weight, persulfate salts are preferably about 0.4 wt % or more, or about 0.4 wt % to about 1.15 wt %, relative to the weight of the monomer, more preferably about 0.48 wt % or more, or about 0.48 wt % to about 1.05 wt %, relative to the weight of the monomer, especially when the monomer is acrylamide.

In some preferred embodiments, the amount of persulfate salt that provides a high yield of polymer is about 1.5 mmol or more, preferably about 1.75 mmol or more, still more preferably about 2 mmol or more, even more preferably about 2.25 mmol or more, per mole of monomer, especially when the initiator is ammonium persulfate, and especially when the monomer is acrylamide. In other preferred embodiments, the amount of persulfate salt that provides a high yield of polymer is about 1.5 mmol to about 2.5 mmol, preferably about 1.75 to about 2.5 mmol, more preferably about 2 mmol to about 2.5 mmol, still more preferably about 2.25 mmol to about 2.5 mmol, per mole of monomer, especially when the initiator is ammonium persulfate, and especially when the monomer is acrylamide.

In terms of weight, in some preferred embodiments, the amount of persulfate salt that provides a high yield of polymer is about 0.48 wt % or more, preferably about 0.55 wt % or more, still more preferably about 0.63 wt % or more, even more preferably about 0.72 wt % or more, relative to the weight of the monomer, especially when the initiator is ammonium persulfate, and especially when the monomer is acrylamide. In other preferred embodiments, the amount of persulfate salt that provides a high yield of polymer is 0.48 wt % to about 0.8 wt %, preferably about 0.55 wt % to about 0.8 wt %, more preferably about 0.63 wt % to about 0.8 wt %, still more preferably about 0.72 wt % to about 0.8 wt %, relative to the weight of the monomer, especially when the initiator is ammonium persulfate, and especially when the monomer is acrylamide.

In some other preferred embodiments, the amount of persulfate salt that provides a high yield of polymer is about 1.9 mmol or more, preferably about 2 mmol or more, still more preferably about 2.25 mmol or more, even more preferably about 2.5 mmol or more, per mole of monomer, especially when the initiator is potassium persulfate, and especially when the monomer is acrylamide. In other preferred embodiments, the amount of persulfate salt that provides a high yield of polymer is about 1.9 mmol to about 3 mmol, preferably about 2 to about 3 mmol, more preferably about 2.25 mmol to about 2.75 mmol, still more preferably about 2.5 mmol to about 2.75 mmol, per mole of monomer, especially when the initiator is potassium persulfate, and especially when the monomer is acrylamide.

In terms of weight, in some other preferred embodiments, the amount of persulfate salt that provides a high yield of polymer is about 0.75 wt % or more, preferably about 0.8 wt % or more, still more preferably about 0.85 wt % or more, still more preferably about 0.95 wt % or more, relative to the weight of the monomer, especially when the initiator is potassium persulfate, and especially when the monomer is acrylamide. In other preferred embodiments, the amount of persulfate salt that provides a high yield of polymer is about 0.75 wt % to about 1.15 wt %, preferably about 0.8 wt % to about 1.15 wt %, more preferably about 0.85 wt % to about 1.05 wt %, still more preferably about 0.95 wt % to about 1.05 wt %, relative to the weight of the monomer, especially when the initiator is potassium persulfate, and especially when the monomer is acrylamide.

As used throughout this document, the term "carrier" is used to mean a catalyst support, and the term "carrier" can be used interchangeably with the term "support". Throughout this document, the term "carrier" refers to a carrier which is in the solid form or is pre-shaped. Such a carrier remains predominantly in the solid form when contacted with a solvent. The term "carrier" does not refer to precursor salts, such as sodium aluminate, which dissolve almost completely in one or more solvents, especially polar solvents.

The carrier is generally carbon and/or an inorganic oxide which is a particulate porous solid. Carbon can be used in combinations with one or more inorganic oxides such as alumina, silica, titania, or boria; silica and especially alumina are preferred for these combinations. An inorganic oxide carrier may be composed of conventional oxides, e.g., alumina, silica, alumina containing silica (e.g., silica-alumina, alumina with silica-alumina dispersed therein, alumina-coated silica, silica-coated alumina), alumina containing boria, alumina containing titania, magnesia, zirconia, boria, and titania, as well as combinations of these oxides. Suitable carriers also include transition aluminas, for example an eta, theta, or gamma alumina. Preferred carriers include silica, alumina, silica-alumina, alumina with silica-alumina dispersed therein, alumina-coated silica, or silica-coated alumina, especially alumina or alumina containing up to about 20 wt % of silica, preferably up to about 12 wt % of silica, more preferably about 0.25 wt % to about 10 wt %, still more preferably about 0.5 wt % to about 2 wt %, or about 5 wt % to about 10 wt % of silica. A carrier containing a transition alumina, for example an eta, theta, or gamma alumina, is particularly preferred, and a gamma-alumina carrier is most preferred.

Another preferred carrier is alumina which contains boron (or boria) or titanium (or titania), especially boria-alumina or titania-alumina. When the alumina contains boron, the boron is preferably in an amount of about 0.5 wt % to about 20 wt %, more preferably about 1 wt % to about 15 wt %, even more preferably about 2 wt % to about 10 wt %, as $B_2O_3$. When the alumina contains titanium, the titanium is preferably in an amount of about 1 wt % to about 50 wt %, more preferably about 5 wt % to about 30 wt %, more preferably about 15 wt % to about 25 wt %, as $TiO_2$.

The carrier is normally employed in a conventional manner in the form of spheres or, preferably, extrudates. Examples of suitable types of extrudates have been disclosed in the literature; see for example U.S. Pat. No. 4,028,227. Highly suitable for use are cylindrical particles (which may or may not be hollow) as well as symmetrical and asymmetrical polylobed particles (2, 3 or 4 lobes). Carrier particles are typically calcined at a temperature in the range of about 400° to about 850° C. before use in forming the catalysts of this invention.

To introduce other elements such as boron, silicon, and/or titanium into a carrier, the carrier can be co-extruded with a compound containing the desired atoms, co-precipitated with a compound containing the desired atoms, or impregnated with a compound containing the desired atoms. For the co-extrusions, the compounds are often oxides or oxygen-containing acids (e.g., $HBO_2$, $H_3BO_3$, or $B_2O_3$ for boron).

When introducing other elements such as boron, silicon, and/or titanium into an inorganic oxide carrier, typically, enough of the compound containing boron to result in about 0.5 wt % to about 20 wt %, preferably about 1 wt % to about 15 wt %, more preferably about 2 wt % to about 10 wt %, as $B_2O_3$ is used; enough of the compound containing titanium to result in about 1 wt % to about 50 wt %, more preferably about 5 wt % to about 30 wt %, more preferably about 15 wt % to about 25 wt %, as $TiO_2$, is used; enough of the compound containing silicon to result in 0.5 wt % to about 15 wt %, preferably about 0.75 to about 10 wt %, more preferably about 0.8 to about 8 wt %, as $SiO_2$ is used. Preferred carriers of this type include alumina containing boron, alumina containing silicon, alumina containing titanium, or a combination of any two or more of these.

Although particular pore dimensions are not required in the practice of this invention, the carrier's pore volume (measured via $N_2$ adsorption) will generally be in the range of about 0.25 to about 1 mL/g. The specific surface area will generally be in the range of about 50 to about 400 $m^2/g$, preferably about 100 to about 300 $m^2/g$, more preferably about 150 to about 275 $m^2/g$ (measured using the Braun-Emmet-Teller (BET) $N_2$ adsorption method). Generally, the catalyst will have a median pore diameter in the range of about 5 nm to about 20 nm, preferably in the range of about 6 nm to about 15 nm, as determined by $N_2$ adsorption. Preferably, about 60% or more of the total pore volume will be in the range of approximately 2 nm from the median pore diameter. The values for the pore size distribution and the surface area given above are determined after calcination of the carrier at about 500° C. for one hour.

The carrier particles typically have an average particle size of about 0.5 mm to about 5 mm, more preferably about 1 mm to about 3 mm, and still more preferably about 1 mm to about 2 mm. Because the size and shape of the carrier is not altered by the process for forming the catalyst, the catalyst generally has an average particle size of about 0.5 mm to about 5 mm, more preferably about 1 mm to about 3 mm, and still more preferably about 1 mm to about 2 mm.

The amount of carrier used to form the catalysts of this invention is about 40 wt % to about 80 wt %, preferably about 50 wt % to about 70 wt %, and more preferably about 60 wt % to about 70 wt %, relative to the total weight of the carrier, hydrogenation metals, and phosphorus, where the hydrogenation metals and phosphorus are expressed as their oxides, i.e., excluding the solvent and the monomer species.

Methods for impregnating the carrier are known to the skilled artisan. Preferred methods include co-impregnation of at least one phosphorus compound, at least one Group VI metal compound, and at least one Group VIII metal compound. In the processes of this invention for forming catalysts, only one impregnation step is needed. In a single impregnation step, once the carrier and impregnation solution are brought together, the mixture is usually homogenized until virtually all of the impregnation solution is taken up into the catalyst. In this technique, which is known in the art as pore volume impregnation or as incipient wetness impregnation, the impregnation solution will be taken up virtually completely by the pores of the catalyst, which makes for an efficient use of chemicals, and avoids dust in the product.

There can be a wide number of variations on the impregnation method. Thus, it is possible to apply a plurality of impregnating steps, the impregnating solutions to be used containing one or more of the component precursors that are to be deposited, or a portion thereof (sequential impregnation). Instead of impregnating techniques, there can be used dipping methods, spraying methods, and so forth. When carrying out multiple impregnation, dipping, etc., steps, drying may be carried out between impregnation steps. However, a single impregnation step is preferred because it is a faster, simpler process, allowing for a higher production rate, and is less costly. Single impregnation also tends to provide catalysts of better quality.

In a preferred one step impregnation procedure, a solution with the required concentrations of Group VI metal, Group VIII metal, and phosphorus is prepared, and then monomer and initiator are added, preferably at room temperature. More preferably, the monomer is added and then the initiator is added. If necessary, the volume of the impregnation solution containing metals, phosphorus, monomer, and initiator is adjusted, usually by dilution, to match the carrier pore volume. One or more organic additives may be added at this point if desired. The temperature of the solution is preferably kept below about 50° C. during the impregnation solution preparation. The impregnation solution is then combined with the carrier at about 90% to about 105% saturation of its pores, more preferably about 98% to about 100% saturation of its pores. The catalyst is typically allowed to age for several minutes or longer at one or more temperatures of about 50° C. or lower. After aging, polymerization is induced. In some embodiments, polymerization is induced by heating the catalysts at about 70° C. to about 90° C., preferably about 75° C. to about 85° C., for about 30 minutes or more. Often, the polymerization can be monitored by measuring the exotherm released during polymerization. Once polymerization has completed, the catalysts are normally dried at one or more temperatures between about 50° C. and about 150° C., preferably about 50° C. to about 80° C.

In a preferred two step impregnation procedure, a solution with the required concentrations of Group VI metal, Group VIII metal, and phosphorus is prepared, and then, if necessary, the volume of the impregnation solution containing metals and phosphorus is adjusted, usually by dilution, to match the carrier pore volume. This solution is combined with the carrier and the resultant solid is dried at one or more temperatures between about 50° C. and about 150° C., preferably about 50° C. to about 80° C. In the second impregnation step, a solution containing the monomer and the initiator is prepared in deionized water. The monomer-containing solution is combined with the metals-impregnated carrier at about 90% to about 105% saturation of its pores, more preferably about 98% to about 100% saturation of its pores. The metals-impregnated carrier is typically allowed to age for about 60 minutes or more at one or more temperatures about 50° C. or lower, more preferably about 40° C. or lower. After aging, polymerization is induced. In some embodiments, polymerization is induced by heating the catalysts at about 70° C. to about 90° C., preferably about 75° C. to about 85° C., for about 30 minutes or more. Often, the polymerization can be monitored by measuring the exotherm released during polymerization. Once polymerization has completed, the catalysts are normally dried at one or more temperatures between about 50° C. and about 150° C., preferably about 50° C. to about 80° C.

When the at least one phosphorus compound, at least one Group VI metal compound, and at least one Group VIII metal compound form part of the monomer-containing mixture, polymerization of the monomer species is preferably performed after the impregnation step, although polymerization can be started during impregnation of the carrier. If polymerization is carried out after impregnation, the polymerizing can be performed before or during removal of excess solvent if excess solvent removal is performed; preferably, polymerization is performed before removal of excess solvent. Similarly, when an impregnation solution and a carrier are brought together to form an impregnated carrier which is then mixed with a monomer, polymerization is preferably performed before removal of excess solvent, if excess solvent removal is performed. It is recommended and preferred to minimize solvent evaporation during the polymerization step.

In the processes of this invention, polymerization is carried out in the usual manner, by exposing the monomer species to an initiator in an amount suitable to polymerize at least a portion of the monomer. When present, any inhibitor needs to be inactivated when starting the polymerization reaction.

When at least one phosphorus compound, at least one Group VI metal compound, and at least one Group VIII metal compound do not form part of the monomer-containing mixture, polymerization is initiated in the presence of the carrier before impregnation, and an impregnation solution is combined with the monomer-containing mixture during polymerization or after polymerization has ended.

The polymer in the catalyst has a carbon backbone and comprises an amido group. The polymer may contain other functional groups comprising at least one heteroatom in addition to the amido group. When present, the other functional group comprises nitrogen, oxygen, or both nitrogen and oxygen. Examples of suitable functional groups include hydroxyl groups, carboxyl groups, carbonyl groups, alkoxy groups such methoxy and ethoxy, amino groups, nitrile groups, amino acid groups, and the like. Preferred functional groups include hydroxyl groups.

Examples of polymers formed as part of the catalysts of the invention include polyacrylamides such as polyacrylamide, polymethacrylamide, poly(N-isopropyl)acrylamide, poly(N-hydroxymethyl)acrylamide, poly(N-hydroxyethyl)acrylamide, poly(N-methoxymethyl)acrylamide, poly(N-ethoxymethyl)acrylamide, and the like. Preferred polymers include polyacrylamide and poly(N-hydroxyethyl)acrylamide; more preferred is polyacrylamide. As noted above, two or more monomer species can be employed, in such instances, the polymer formed is a co-polymer, which can be a co-polymer of any two or more of the polymers listed above.

Although the monomers used to form the supported catalyst will often be soluble in a solvent, the polymer formed from the monomer(s) does not need to be soluble in the solvent(s) used in forming the catalysts.

The processes of the present invention yield supported catalysts in which the Group VIII metal is usually present in an amount of about 1 to about 10 wt %, preferably about 3 to about 8.5 wt %, calculated as a monoxide. In these catalysts, phosphorus is usually present in an amount of about 0.5 to about 10 wt %, more preferably about 1 to about 9 wt %, calculated as $P_2O_5$. When the Group VI metal in the catalyst is molybdenum, it will usually be present in an amount of about 35 wt % or less, preferably in an amount of about 15 to about 35 wt %, calculated as molybdenum trioxide.

When at least one phosphorus compound, at least one Group VI metal compound, and at least one Group VIII metal compound, or an impregnation solution are included before or during polymerization, a supported catalyst is obtained at the end of the polymerization step. If instead a polymerized product is formed and then contacted with an impregnation solution after polymerization, a supported catalyst is obtained at the end of the impregnation step or steps.

Optionally, excess solvent is removed from the supported catalyst. The removing of excess solvent may be carried out in air, under vacuum, or in the presence of an inert gas. Solvent removal is preferably achieved by drying the supported catalyst. Drying of the supported catalyst is conducted under such conditions that at least a portion of the polymer remains in the catalyst, i.e., the polymer is not completely removed by decomposition. Thus, the drying conditions to be applied depend on the temperature at which the particular polymer decomposes; decomposition can include combustion when the drying is conducted in the presence of oxygen. In these processes of the invention, drying should be carried out under such conditions that about 50% or more, preferably about 70% or more, more preferably about 90% or more, of the polymer is still present in the catalyst after drying. It is preferred to keep as much of the polymer as possible in the supported catalyst during drying; however, it is understood that loss of some of the polymer during the drying step cannot always be avoided, at least for more easily decomposed polymers. A drying temperature below about 270° C. may be necessary, depending on the polymer. In some embodiments, the drying temperature at atmospheric pressure is preferably about 25° C. to about 200° C., more preferably about 50° C. to about 150° C., even more preferably about 75° C. to about 125° C.; the drying temperature(s) should be lower than the decomposition temperature of the polymer. Reduced pressure and/or vacuum conditions can be used for drying.

As mentioned above, the supported catalysts of this invention comprise a carrier, phosphorus, at least one Group VI metal, at least one Group VIII metal, and a polymer, where the molar ratio of phosphorus to Group VI metal is about 1:1.5 to less than about 1:12, the molar ratio of the Group VI metal to the Group VIII metal is about 1:1 to about 5:1, and the polymer has a carbon backbone and comprises functional groups having at least one heteroatom. The carriers and the preferences therefor are as described above. The carrier in the supported catalysts of this invention is in an amount of about 40 wt % to about 80 wt %, preferably about 50 wt % to about 70 wt %, and more preferably about 60 wt % to about 70 wt %, relative to the total weight of the carrier, hydrogenation metals, and phosphorus, where the hydrogenation metals and phosphorus are expressed as their oxides, i.e., excluding the polymer. The hydrogenation metals and the preferences therefor are as described above. In the polymers, the carbon backbone is sometimes referred to as a carbon-carbon backbone, where the backbone is the main chain of the polymer. Polymers in the supported catalysts and the preferences therefor are as described above.

Optionally, catalysts of the invention may be subjected to a sulfidation step (treatment) to convert the metal components to their sulfides. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., an organic or inorganic polysulfide or elemental sulfur, outside the reactor and, if necessary, dried, preferably in an inert atmosphere. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulphiding agent, such as hydrogen sulfide or a compound which under the prevailing conditions is decomposable into hydrogen sulphide (e.g., dimethyl disulfide). It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent such as dimethyl disulfide (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

When the catalyst is subjected to an in situ sulfidation step, the catalyst is exposed to high temperatures in the presence of oil and water formed during the process before sulfidation is complete. This exposure to high temperatures in the presence of oil and water does not appear to adversely affect catalyst activity. Without wishing to be bound by theory, it is thought that the polymer is more resistant to leaching or evaporation in comparison to catalysts described in the art that have low molecular weight organic additives.

The catalyst compositions of this invention are those produced by the above-described process, whether or not the process included an optional sulfiding step.

Without wishing to be bound by theory, both the observed greater dispersion of the hydrogenation metals and weak (low) metal-support interaction are achieved by employing monomers having functional groups as described above to form polymers in the supported catalysts. Such polymers are hypothesized to help disperse the hydrogenation metals throughout the pore network. Also without wishing to be bound by theory, hydrogenation metals are believed to interact with the polymer, which disperses the hydrogenation metals in the pore spaces of the support. It is also hypothesized that activation of the catalyst in a sulfiding atmosphere replaces at least some of the polymer's functional group heteroatoms with sulfur, which is believed to help minimize or prevent the hydrogenation metals from clustering together or interacting with the support, which minimized clustering and/or interacting with the support in turn is believed to contribute to the observed enhanced catalyst activity. In addition, it is theorized that the polymer (after sulfidation) may suppress sintering of the hydrogenation metals, contributing to improved stability of the supported catalyst.

The catalyst compositions of this invention can be used in the hydrotreating, hydrodenitrogenation, and/or hydrodesulfurization of a wide range of hydrocarbon feeds. Examples of suitable feeds include middle distillates, kero, naphtha, vacuum gas oils, heavy gas oils, and the like.

Methods of the invention are methods for hydrotreating, hydrodenitrogenation, and/or hydrodesulfurization of a hydrocarbon feed, which methods comprise contacting a hydrocarbon feed and a catalyst of the invention. Hydrotreating of hydrocarbon feeds involves treating the feed with hydrogen in the presence of a catalyst composition of the invention at hydrotreating conditions.

Conventional hydrotreating process conditions, such as temperatures in the range of about 250° to about 450° C., reactor inlet hydrogen partial pressures in the range of about 5 to about 250 bar (about $5 \times 10^5$ Pa to about $2.5 \times 10^7$ Pa), space velocities in the range of about 0.1 to about 10 vol./vol. hr, and H$_2$/feed ratios in the range of about 50 to about 2000 NL/L, can be applied.

As shown in the Examples, polymer loadings up to at least 18 wt % relative to the other catalyst components were achieved. The amount of polymer present in the supported catalyst (polymer loading) is defined similarly to the way the amount of monomer relative to the other catalyst components is defined above. In other words, the amount of polymer in the catalysts of this invention is expressed as wt % relative to the total weight of the carrier, Group VI metal, Group VIII metal, and phosphorus, where the Group VI metal, Group VIII metal, and phosphorus are expressed as their oxides; the weight of any solvent is excluded. For example, if the total weight of the other components of the catalyst is 100 grams, 10 wt % of polymer is 10 grams. In this invention, the polymer loading is generally about 1.5 wt % or more, preferably in the range of about 1.5 wt % to about 35 wt %, relative to the total weight of the other components in the catalyst, expressed as their oxides and excluding any solvent, although amounts outside these ranges are within the scope of the invention. More preferably, the polymer loading is in the range of about 3 wt % to about 30 wt %, even more preferably in the range of about 5 wt % to about 25 wt %, still more preferably in the range of about 10 wt % to about 21 wt %, relative to the total weight of the other components of the catalyst.

The following examples are presented for purposes of illustration, and are not intended to impose limitations on the scope of this invention.

In several Examples below, a carbon yield (C-yield) is reported. The carbon yield is defined as the % of carbon that was introduced into the sample via the monomer and was still present after drying of the materials.

In some instances, catalyst activities are reported as the relative weight activity (RWA). The relative weight activity for both hydrodesulfurization (HDS) and hydrodenitrogenation (HDN) are reported relative to a comparative run, where the catalytic activity of the comparative run is set at an arbitrary value (e.g., 100), and the RWA of the catalyst being tested is reported as a multiple of the value for the comparative catalyst run.

In Table 2 below, the catalyst activities are reported as the rate constants $k_{wt,HDS}$ and $k_{wt,HDN}$. For sulfur, the rate constant $k_{wt,HDS}$ was calculated using the following formula:

$$k_{wt,HDS} = WHSV * 1/(n-1) * (1/S^{n-1} - 1/S_0^{n-1})$$

where WHSV is the weight hourly space velocity ($g_{oil}/g_{cat}$/h); S is the percentage of sulfur in the product (ppm wt S); $S_0$ is the percentage of sulfur in the feed (ppm wt S); and n is the reaction order of the hydrodesulfurisation reaction. For tests at 20 bar ($2.0 \times 10^6$ Pa) and 45 bar ($4.5 \times 10^6$ Pa), an n value of 1.4 was used. For testing at 90 bar ($9.0 \times 10^6$ Pa), an n value of 1.2 was used.

For nitrogen, the rate constant $k_{wt,HDN}$ was calculated using the following formula:

$$k_{wt,HDN} = WHSV * \ln(N_0/N)$$

where WHSV is the weight hourly space velocity ($g_{oil}/g_{cat}$/h); N is the percentage of nitrogen in the product (ppm wt N); and $N_0$ is the percentage of nitrogen in the feed (ppm wt N). The WHSV was calculated based on the catalyst weight after calcination in air at 600° C.

Example 1

Polymerization of Various Monomers in the Presence of an Al$_2$O$_3$ Carrier

Several aqueous solutions, each with a different monomer, potassium persulfate and extrudates of Al$_2$O$_3$ (surface area, BET: 266 g/m$^2$), were prepared at a concentration of 0.24 g monomer/g Al$_2$O$_3$ and 0.012 g K$_2$S$_2$O$_8$/g Al$_2$O$_3$. The monomers are listed in Table 1. The resulting extrudates saturated with the aqueous monomer solutions were heated for 16 hours at 80° C. in a closed vessel. Next, the samples were kept at 120° C. in an open vessel for 1 hour to remove excess water. The carbon content of the thus obtained materials are reported in Table 1. Runs 1C and 2C are comparative.

TABLE 1

| Carrier | Monomer | Carbon | C-yield |
| --- | --- | --- | --- |
| 1C | Acrylic acid | 9.53 wt % | 100% |
| 2C | Maleic acid | 7.08 wt % | 100% |
| 3 | N-Hydroxyethyl acrylamide | 9.77 wt % | 100% |

Example 2

Raman Measurements of Different Monomers on Al$_2$O$_3$ Supports

A carrier sample was prepared for comparative purposes. An extruded Al$_2$O$_3$ carrier as in Example 1 was saturated with an aqueous solution of acrylic acid at a concentration of 0.24 g monomer/g Al$_2$O$_3$ without potassium persulfate (KPS) present. The extrudates, saturated with the aqueous monomer solution, were heated for 16 hours at 80° C. in a closed vessel. Next, the extrudates were kept at 120° C. in an open vessel for 1 hour to remove excess water. This was comparative sample 4C.

Raman spectra were recorded for comparative sample 4C, and for Carrier 1C and Carrier 2C from Example 1 (Table 1); the Raman spectra are shown in FIG. 1. The Raman measurements were performed at 514 nm excitation; the laser power was controlled to avoid sample damage. The spectra were recorded with a 10×10 second acquisition time.

The spectrum of comparative sample 4C shows peaks characteristic of unreacted acrylic acid. The peak at 1640 cm$^{-1}$, which is associated with C=C stretch vibrations, is a clear sign that unreacted acrylic acid was present in comparative sample 4C. The spectrum of Carrier 1C clearly shows that polymerization had occurred; the peak at 2929 cm$^{-1}$ is characteristic for polyacrylic acid. The absence of a peak at 1640 cm$^{-1}$ indicated that no C=C bonds were present in Carrier 1C. For a validation of the assignments of peaks characteristic of acrylic acid and polyacrylic acid, see for example, C. Murli and Y. Song, *Journal of Physical Chemistry B*, 2010, 114, 9744-9750. The spectrum of Carrier 2C shows bands that can be assigned to unreacted maleic acid and to polymaleic acid. The peak at 2931 cm$^{-1}$ indicates that a significant amount of polymaleic acid was present, while the peaks at 1657 cm$^{-1}$ and 3052 cm$^{-1}$ indicate the presence of unreacted C=C bonds in Carrier 2C. For a validation of the assignments of peaks characteristic of maleic acid and polymaleic acid, see for example, C. Q. Yang and X. Gu, *Journal of Applied Polymer Science*, 2001, 81, 223-228. Thus Carriers 1C and 2C, each of which had an initiator, contained a significant amount of polymer, while sample 4C, which did not have an initiator, did not contain detectable amounts of polymer.

These experiments show that an appropriate initiator and/or conditions appear to be needed to polymerize monomers in the presence of carriers. In other words, the carrier by itself does not induce polymerization of the monomer(s).

Example 3

Preparation of Polymer-Modified Catalyst Containing Co, Mo, and P

The materials prepared in Example 1 were loaded with metals by pore volume impregnation. A stock solution containing Mo at a concentration of 583 g $MoO_3$/L, Co at a concentration of 104 g CoO/L and $H_3PO_4$ at a concentration of 42 g $P_2O_5$/L was prepared by mixing $MoO_3$, $Co(OH)_x$ $(CO_3)_y$, and $H_3PO_4$ (aq., 85%), and water in appropriate amounts, and agitating and heating this mixture at 70° C. or above until a clear solution was obtained. As an additional comparative sample, the same stock solution and preparation method were used to prepare a catalyst starting from $Al_2O_3$ extrudates like those used in Example 1, but without any monomer. For each preparation, the stock solution was diluted with enough water so that the final catalyst samples each contained 28 wt % $MoO_3$, measured after calcination at 600° C.

Example 4

Activity Testing of Catalysts Containing Co, Mo, and P

The catalysts prepared as described in Example 3 were ground; powder fractions of 125 to 350 µm were isolated by sieving. The 125 to 350 µm fractions were evaluated for their performance in hydrodesulfurization and hydrodenitrogenation. The catalysts were sulfided by contacting them with dimethyl disulfide (2.5 wt % S) spiked SR-LGO in a two-step process with a temperature hold for 8 hours at 250° C. and 5 hours at 320° C. just prior to running the test. The samples were tested at 45 bar (4.5×10⁶ Pa) for their performance in hydrodesulfurization and hydrodenitrogenation with straight run gas oil (SRGO) of Feed B. Feed B contained 7914 ppm sulfur, 169 ppm of nitrogen, and had a density of 0.8574 g/mL; the boiling point distribution of Feed B is shown in Table 2. Catalyst activity was evaluated at a temperature of 350° C., while the $H_2$ to oil ratio was 300 NL/L, and the weight hourly space velocity (WHSV) was in the range of 2.5-3.5/hour. The actual weight of catalyst in the different reactors, the applied WHSV, and sulfur and nitrogen values in the liquid product samples are presented for the different catalysts in Table 2. S and N values were obtained by taking the average value of 4 liquid product samples obtained between 6 and 8 days after introduction of Feed B. The HDS order used was 1.4.

TABLE 2

| Run | Carrier* | Monomer | WHSV $g_{oil}/g_{cat}$/h | Test result S ppm | Test result N ppm | Activity $k_{wt}$, HDS n = 1.4 | Activity $k_{wt}$, HDN n = 1.0 |
|---|---|---|---|---|---|---|---|
| 5C | 1C | Acrylic acid | 3.10 | 31.1 | 6.5 | 1.75 | 10.1 |
| 6C | 2C | Maleic acid | 2.63 | 15.1 | 3.1 | 2.04 | 10.5 |
| 7 | 3 | N-Hydroxyethyl acrylamide | 2.71 | 15.8 | 3.0 | 2.06 | 10.9 |
| 8C | $Al_2O_3$ | None | 2.74 | 50.6 | 24.6 | 1.24 | 5.3 |

*See Example 1 and Table 1.

There is a clear benefit in the HDS and HDN activity of catalysts 5C, 6C, and 7 as compared to catalyst 8C, to which no monomer was added. The results in the above Table show that introduction of a monomer to the carrier before introduction of the active metals is feasible, and that polymerization of the monomer provides the catalyst activity benefit.

Example 5

Several samples were prepared from alumina and acrylamide, with different polymerization initiators and/or different amounts of the polymerization initiator. Acrylamide was 20 wt % relative to the weight of the combined monomer and carrier. After polymerization, the samples were dried at 80° C. The samples were analyzed by evolved gas analysis (EGA) at 600° C. under helium. Some of the compounds generated by the heating were acrylonitrile and acrylamide, which are known to be toxic. The polymer yield, similar to the carbon yield, was calculated as the amount of carbon remaining after EGA treatment divided by the amount of carbon in the dried product, and the polymer yield is reported in Table 3 below. Run C-a is comparative.

TABLE 3

| Run | Initiator | Initiator amount | Polymer yield |
|---|---|---|---|
| C-a | — | 0 | 21% |
| b | Potassium persulfate | 0.5 wt % | 40% |
| c | Ammonium persulfate | 0.5 wt % | 66% |
| d | Ammonium persulfate | 0.75 wt % | 86% |
| e | Potassium persulfate | 0.75 wt % | 81% |
| f | Potassium persulfate | 1 wt % | 98% |
| g | Ammonium persulfate | 1 wt % | 87% |
| h | $H_2O_2$ | 1 wt % | 38% |
| i | $H_2O_2$ | 5 wt % | 69% |
| j | $H_2O_2$ | 10 wt % | 80% |

Example 6

Several samples were prepared from a stock impregnation solution containing cobalt in an amount to provide 5.4 wt % as CoO, molybdenum to provide 26 wt % as $MoO_3$, and phosphorus to provide 2.65 wt % as $P_2O_5$. Acrylamide (1.52 g), potassium persulfate (15 mg; 1 wt % relative to acrylamide), and alumina (5 g) were mixed with 4.81 g of the impregnation solution. After impregnation and aging, each mixture was heated at 80° C. and monitored for an exotherm. The sample that did not contain an initiator did not show an exotherm. An exotherm indicates occurrence of the polymerization reaction.

Example 7

Several samples were prepared from the stock impregnation solution described in Example 6. Acrylamide (1.52 g), carrier (5 g), and $H_2O_2$ (aq., 30%) were mixed with 4.81 g of the impregnation solution, and then each mixture was heated at 80° C. and monitored for the presence of an exotherm, which indicates occurrence of the polymerization reaction. Results are summarized in Table 4. Runs C-k, C-r, and C-s are comparative.

TABLE 4

| Run | Amt. $H_2O_2$ | $H_2O_2$ rel. to acrylamide | Carrier | Exotherm |
|---|---|---|---|---|
| C-k | 0.51 g | 10 wt % | none | no |
| m | 0.05 g | 1 wt % | alumina | mild |
| n | 0.25 g | 5 wt % | alumina | yes |
| o | 0.52 g | 10 wt % | alumina | yes |

TABLE 4-continued

| Run | Amt. H$_2$O$_2$ | H$_2$O$_2$ rel. to acrylamide | Carrier | Exotherm |
|---|---|---|---|---|
| p | 1.02 g | 20 wt % | alumina | yes |
| q | 0.25 g | 5 wt % | titania | mild |
| C-r | 0.25 g | 5 wt % | silica | no |
| C-s | 0.25 g | 5 wt % | alumina + silica | no |

The effect of the carrier on the polymerization when hydrogen peroxide is the initiator is noted, and theorized to be a pH effect, though this is not certain.

In some of the following Examples, diethylene glycol (DEG) was used in comparative solutions because DEG is considered to be a state of the art additive. See in this connection U.S. Pat. Nos. 6,753,291 and 6,923,904.

For Examples 8-10, a stock impregnation solution containing 104 g/L cobalt as CoO, 583 g/L molybdenum as MoO$_3$, and 42 g/L phosphorus as P$_2$O$_5$ was prepared by mixing together cobalt carbonate (Co(OH)$_x$(CO$_3$)$_y$), MoO$_3$, H$_3$PO$_4$ (aq., 85%), and water in appropriate amounts. The mixture was heated at temperatures above 70° C. until a clear solution was obtained. The volume of the solution was reduced to the desired value by heating the solution to 90 to 100° C. under atmospheric pressure. No monomer or initiator was present in this stock solution.

For a one step impregnation procedure, a solution with the required concentrations of molybdenum, cobalt, and phosphorus was prepared from the stock solution. The monomer was then added at room temperature, followed by the initiator. Then, the volume of the impregnation solution containing metals, phosphorus, monomer, and initiator was adjusted to 100% of the support pore volume by diluting with deionized water. Organic additives may be added at this point if desired. The temperature of the solution was kept below 50° C. during the preparation of the solution for the one step impregnation procedure to prevent polymerization in the solution before the impregnation has completed. The final solution should be a clear liquid. The final solution was then introduced onto the alumina extrudates at 90 to 105% saturation of its pores. The catalyst was allowed to age for at least 60 minutes below 50° C. to homogeneously distribute the solution throughout the alumina extrudates without inducing polymerization. After aging, polymerization was induced by heating the catalysts at 70 to 90° C. for at least 30 minutes. The polymerization was monitored by measuring the exotherm released during the polymerization. Once polymerization completed, the catalysts were dried at temperatures between 50 and 150° C. to remove excess water.

For a two step impregnation procedure, a solution with the required concentrations of molybdenum, cobalt, and phosphorus was prepared from the stock solution as described for the one step procedure, except that the monomer and initiator were not present in the solution. This solution was combined with the alumina extrudates and dried as described above. In the second impregnation step, a solution containing the monomer and the initiator was prepared in deionized water. The monomer-containing solution was introduced onto the metals-impregnated alumina extrudates at 90 to 105% saturation of its pores. The catalyst was allowed to age for at least 60 minutes at 40° C., and then was polymerized by heating the catalysts at 70 to 90° C. for at least 30 minutes. The polymerization was monitored by measuring the exotherm released during the polymerization. Once polymerization was completed, the catalysts were dried at temperatures between 50 and 150° C. to remove excess water.

Example 8

Preparation of Polymer-Modified Catalysts Containing Co, Mo, and P

A series of samples was made with either acrylic acid (AA) or acrylamide (AAM) and portions of the above-described stock solution. Diethylene glycol (DEG) was added to one of the solutions that did not contain either acrylic acid or acrylamide. To prepare the samples, a quantity of the above stock solution was weighed into a round bottom flask. Extrudates of gamma-alumina having a surface area of 271 m$^2$/g were used as the carrier. The catalysts in some runs were prepared using the one-step impregnation method described above; the catalysts in other runs were prepared using the two-step impregnation method described above. At the appropriate point in the impregnation procedure, acrylic acid or acrylamide and potassium persulfate, or diethylene glycol (DEG) was added.

The amounts of the some reagents used in the sample preparation are listed in Table 5. The extruded alumina carriers had a surface area of 271 m$^2$/g. The product catalysts of all of the runs in Table 3 contained 24.0 wt % Mo as MoO$_3$; 5.0 wt % Co as CoO; 2.8 wt % P as P$_2$O$_5$; and 68.2 wt % Al$_2$O$_3$, all relative to the total weight of the carrier, hydrogenation metals, and phosphorus expressed as their oxides. In Table 5, the amounts of monomer, initiator, and organic additive are relative to the total (dry) weight of the alumina, MoO$_3$, CoO, and P$_2$O$_5$. Runs C1-C3 are comparative.

TABLE 5

| | Monomer | | | | Impreg. |
|---|---|---|---|---|---|
| Run | AAM | AA | KPS | DEG | steps |
| C1 | — | — | — | — | 1 |
| C2 | — | 20 wt % | 0.2 wt % | — | 2 |
| C3 | — | 10 wt % | 0.2 wt % | — | 1 |
| 4 | 20 wt % | — | 0.2 wt % | — | 1 |
| 5 | 20 wt % | — | 0.2 wt % | — | 2 |
| 6 | 10 wt % | — | 0.2 wt % | — | 1 |

Figure 2:
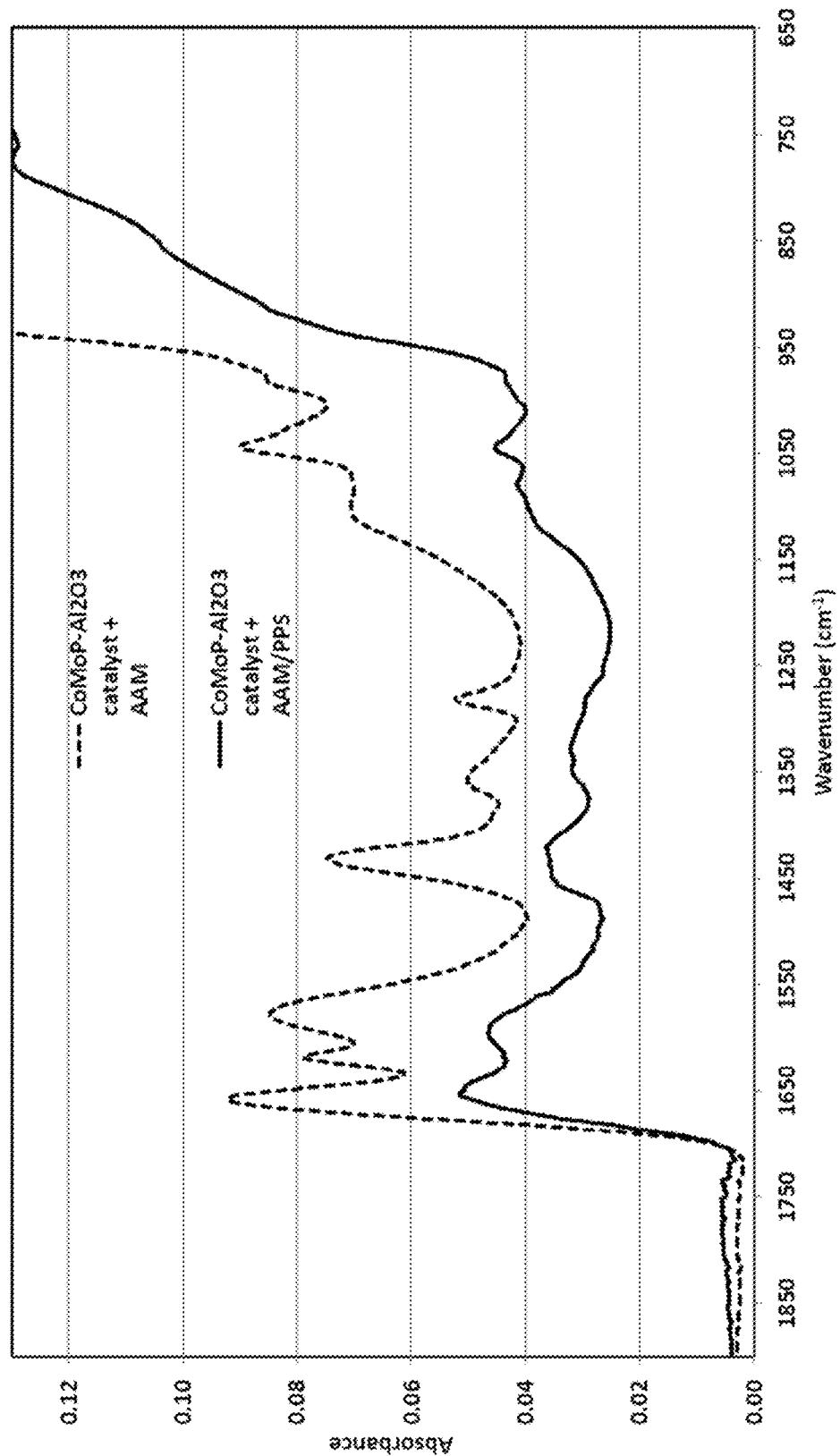
FIG. 2 shows FT-IR spectra providing evidence of polymerization in a sample prepared in Example 5.
Figures 1, 3:
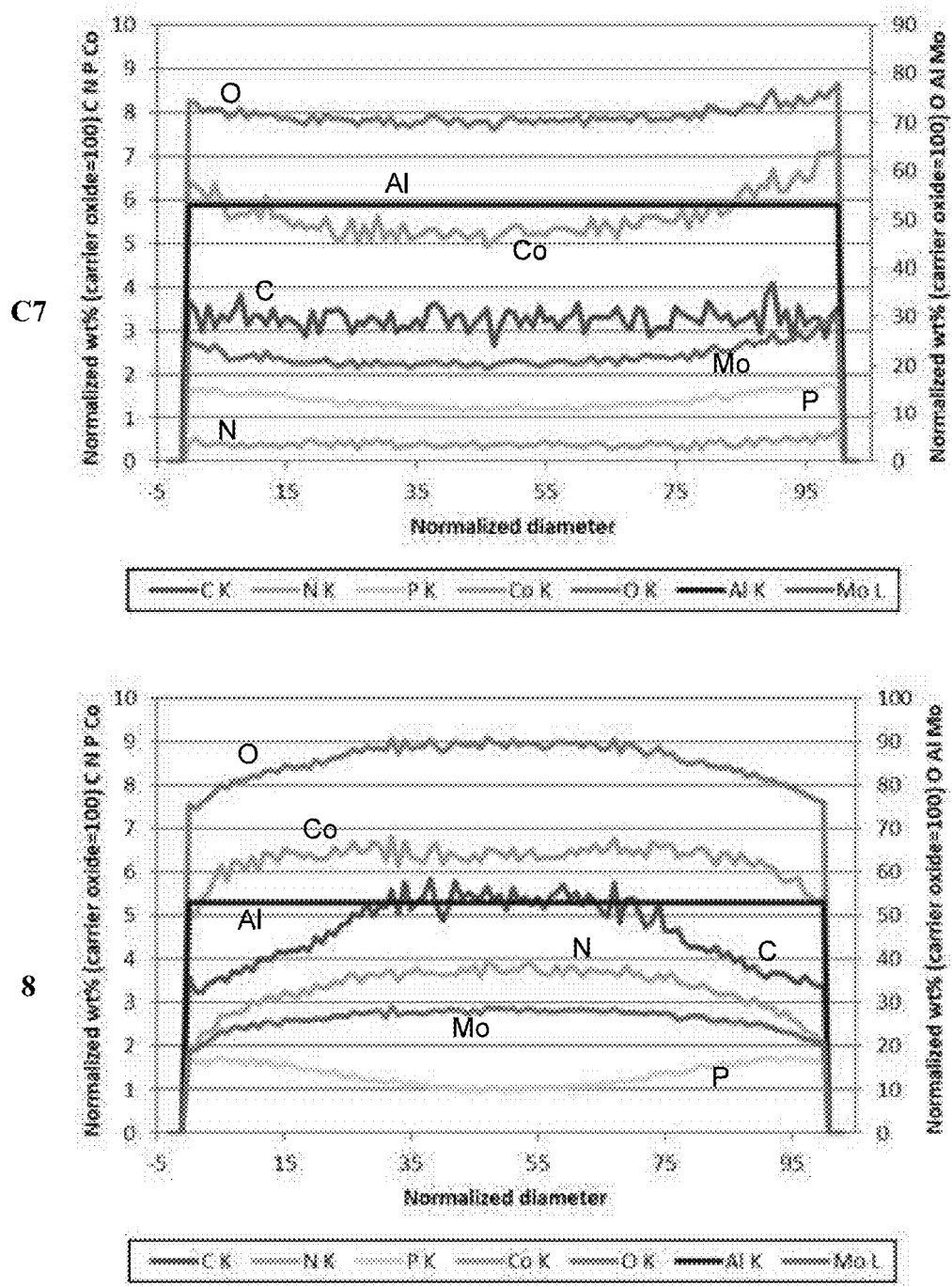
Figures 2, 3:
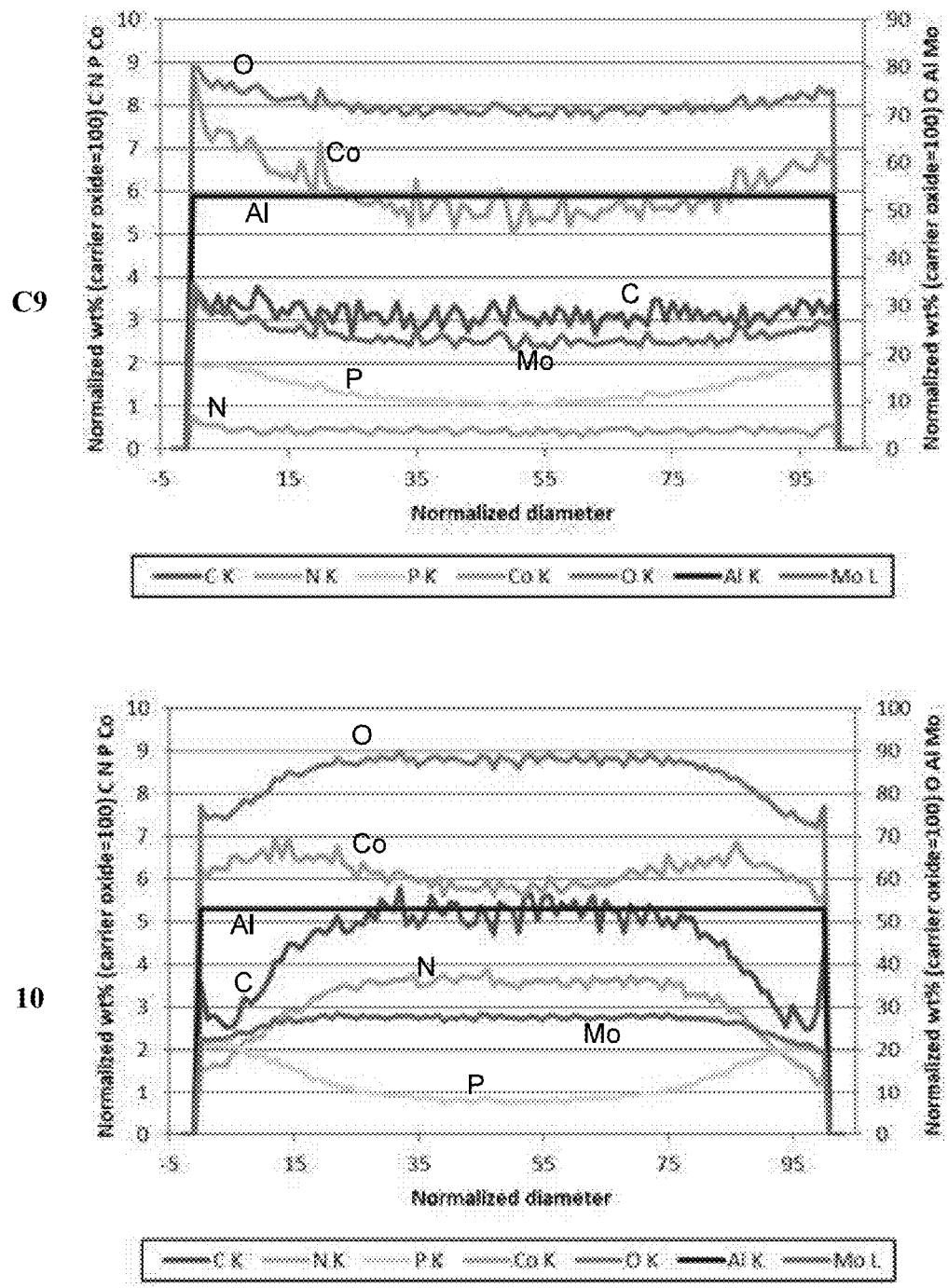
Figure 3:
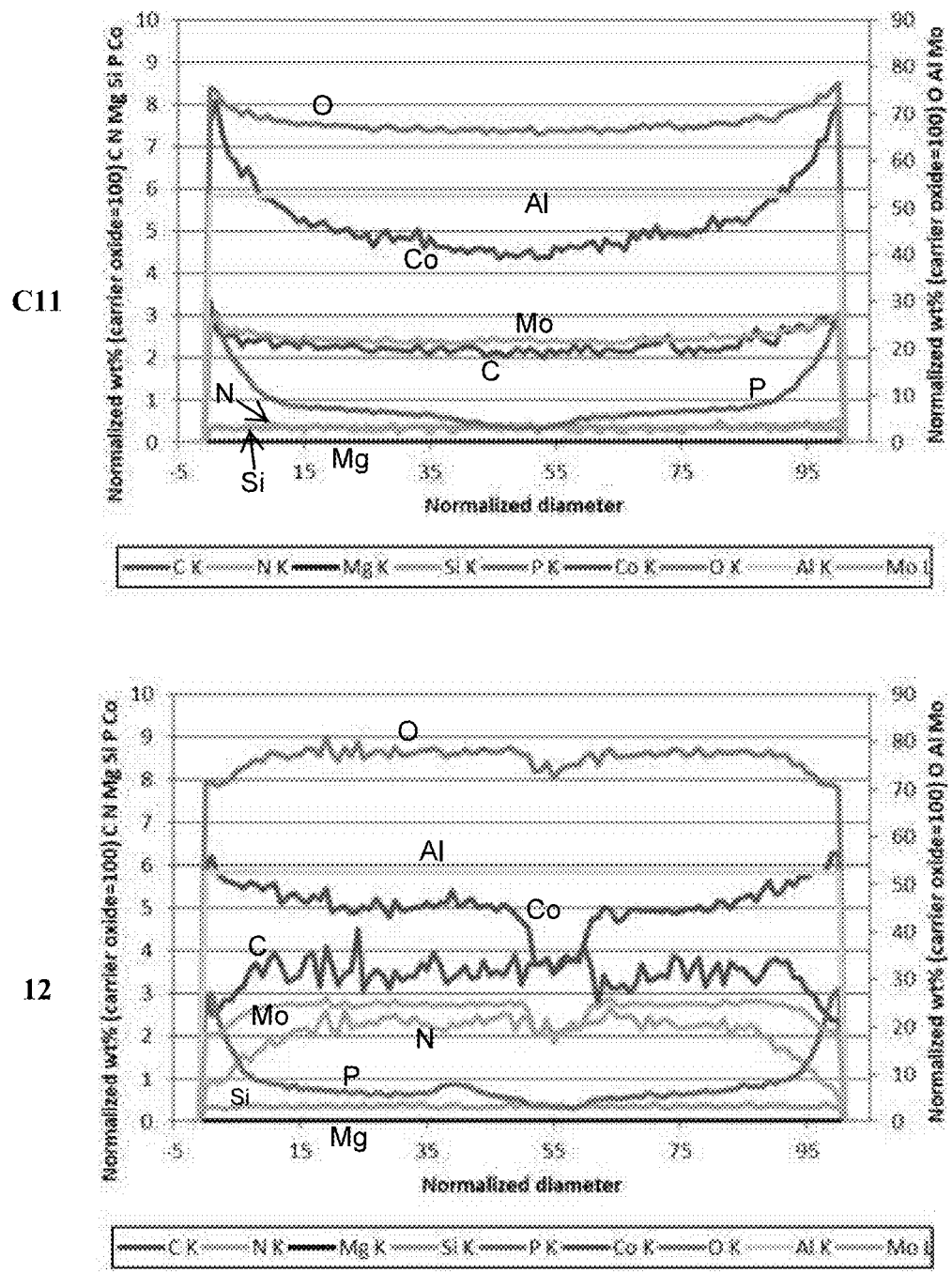
Figure 3:
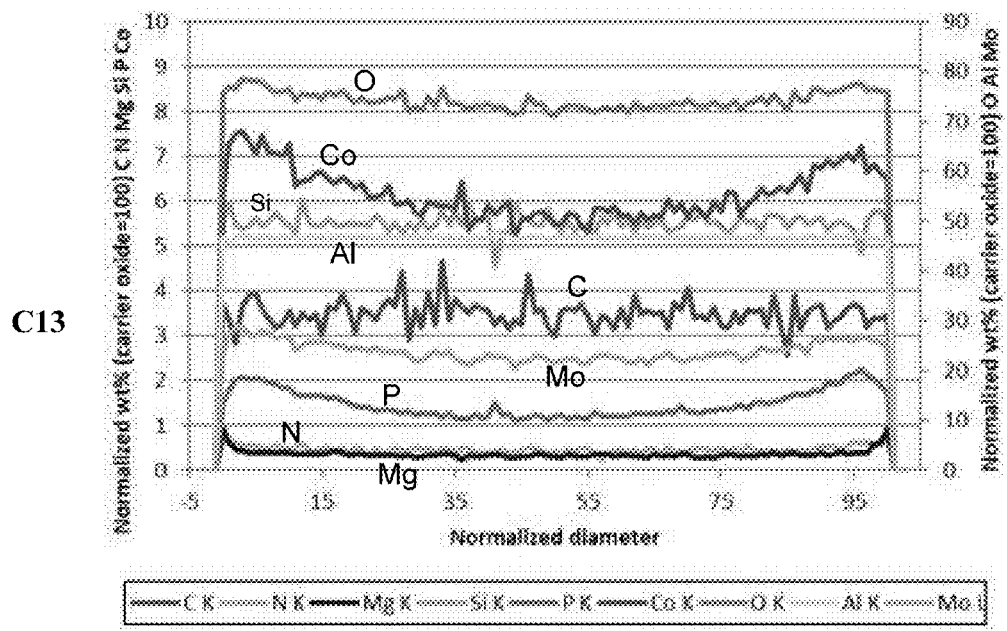

FIG. 2 shows FT-IR spectra for an inventive catalyst similar to that in Run 5 (solid line—initiator; PPS is potassium persulfate) and a comparative run similar to Run 5 but without an initiator (dashed line). This comparative sample did not show signs of polymerization, such as an exotherm during preparation. In addition, some features of acrylamide can be recognized in the FT-IR spectrum of the comparative sample, such as the acrylamide C—N stretch at 1430 cm$^{-1}$ and —CH$_2$— rocking at 1053 cm$^{-1}$ (dashed line), based on a comparison to literature (*Journal of the Korean Physical Society*, 1998, 32, 505-512). For the inventive catalyst similar to that in Run 5, the FT-IR spectrum (solid line) shows the disappearance of characteristic acrylamide signals such as the C—C stretch at 1612 cm$^{-1}$, and appearance of polyacrylamide signals, such as the —CH$_2$— deformation at 1465 cm$^{-1}$ and C—N stretch at 1420 cm$^{-1}$, suggesting successful polymerization. The heterogeneity of these catalysts prevents thorough characterization.

Example 9

Preparation of Polymer-Modified Catalysts Containing Co, Mo, and P

Some samples were made with acrylamide (AAM) and portions of the above-described stock solution. To prepare the samples, a quantity of the above stock solution was weighed into a round bottom flask, and acrylamide was added to some of the solutions; the contents were mixed by swirling the flask. Potassium persulfate (KPS) was then added to the solutions containing acrylamide, and the contents were mixed by swirling the flask. DEG was added to the solutions that did not contain acrylamide. Extrudates of gamma-alumina were used as the carrier. The catalysts in all of the runs in this Example were prepared using the one-step impregnation method described above. The amounts of the some reagents and some of the catalyst properties are listed in Table 4. In Table 6, the amounts of Co, Mo, P, and alumina are reported relative to the total weight of the carrier, hydrogenation metals, and phosphorus; the amounts of monomer, initiator, and organic additive are relative to the total (dry) weight of the alumina, $MoO_3$, CoO, and $P_2O_5$. Runs C7 and C9 are comparative.

TABLE 6

| | Catalyst content | | | | | Reagent amounts | | |
|---|---|---|---|---|---|---|---|---|
| Run | $MoO_3$ (wt %) | CoO (wt %) | $P_2O_5$ (wt %) | $Al_2O_3$ (wt %) | $Al_2O_3$ surface area | AAM (wt %) | KPS (wt %) | DEG (wt %) |
| C7 | 23.9 | 5.0 | 2.5 | 68.6 | 186 m²/g | — | — | 11 |
| 8 | 23.9 | 5.0 | 2.5 | 68.6 | 186 m²/g | 18 | 0.18 | — |
| C9 | 24.5 | 5.1 | 2.5 | 67.9 | 271 m²/g | — | — | 11 |
| 10 | 24.5 | 5.1 | 2.5 | 67.9 | 271 m²/g | 19 | 0.19 | — |

Example 10

Preparation of Polymer-Modified Catalysts Containing Co, Mo, and P

The procedure of Example 9 was followed to prepare catalyst samples containing Co, Mo, and P with acrylamide, using the above-described stock solution and an extruded alumina carrier. Some of the alumina carriers contained boron, silicon, or titanium; the boron was introduced by co-extrusion with the alumina; titanium was introduced by impregnation, and silicon was introduced by co-precipitation. Procedures for co-extrusion are described for example in International Publication No. WO 2010/121807. Some of the samples did not contain acrylamide; DEG was added to these samples. The catalysts in all of the runs in this Example were prepared using the one-step impregnation method described above. The amounts of the some reagents and some of the catalyst properties are listed in Table 7. In Table 7, the amounts of Co, Mo, P, and alumina are reported relative to the total weight of the carrier, hydrogenation metals, and phosphorus; the amounts of monomer, initiator, and organic additive are relative to the total (dry) weight of the alumina, $MoO_3$, CoO, and $P_2O_5$. Runs C11, C13, C15, and C17 are comparative.

TABLE 7

| | Catalyst content | | | | $Al_2O_3$ | Reagent amounts | | | |
|---|---|---|---|---|---|---|---|---|---|
| Run | $MoO_3$ (wt %) | CoO (wt %) | $P_2O_5$ (wt %) | $Al_2O_3$ (wt %) | surface area | Dopant in $Al_2O_3$ (wt %) | AAM (wt %) | KPS (wt %) | DEG (wt %) |
| C11 | 23.3 | 4.8 | 2.4 | 68.8 | 348 m²/g | $SiO_2$ (0.7) | — | — | 11 |
| 12 | 23.3 | 4.8 | 2.4 | 68.8 | 348 m²/g | SiO2 (0.7) | 18 | 0.18 | — |
| C13 | 25.1 | 5.0 | 2.7 | 59.1 | 260 m²/g | $SiO_2$ (8.0) | — | — | 11 |
| 14 | 25.1 | 5.0 | 2.7 | 59.1 | 260 m²/g | $SiO_2$ (8.0) | 19 | 0.19 | — |
| C15 | 25.9 | 5.4 | 2.7 | 63.2 | 252 m²/g | $B_2O_3$ (2.7) | — | — | 12 |
| 16 | 25.9 | 5.4 | 2.7 | 63.2 | 252 m²/g | $B_2O_3$ (2.7) | 19 | 0.19 | |
| C17 | 22.5 | 4.6 | 2.2 | 63.6 | 268 m²/g | $TiO_2$ (7.1) | — | — | 10 |
| 18 | 22.5 | 4.6 | 2.2 | 63.6 | 268 m²/g | $TiO_2$ (7.1) | 17 | 0.17 | — |

Samples from the runs listed in Tables 6 and 7 were subjected to scanning electron microscopy energy-dispersive x-ray (SEM-EDX) linescan analysis. Each sample was dried at 150° C. for 24 hours under vacuum (~0.05 mbar), and then embedded in an epoxy resin (EpoFix, Struers Inc.) at atmospheric pressure. In order to avoid resin penetration into the extrudates as much as possible (<5 µm), the resin was pre-cured for approximately 70 minutes prior to the embedding procedure. The embedded samples were ground and polished. During the grinding and polishing process, the specimens were isolated from atmosphere by lubrication/smearing liquids. After subsequent ultrasonic cleaning in 2-propanol, the specimens were dried under vacuum, coated with a gold layer to a thickness of about 2 nm, and stored in a desiccator under vacuum until they were loaded into the scanning electron microscope. The linescan measurements were performed on a scanning electron microscope (Zeiss EVO MA 15 with Noran system 7; source: $LaB_6$; beam current: 4.2 nA).

Results are shown in FIGS. 3-1 to 3-6 as grams of element per 100 grams carrier (here, alumina). Over the cross section of an extrudate (carrier), the weight of pure carrier per unit of volume does not change regardless the weight of impregnated elements, so the grams of elements indicate whether the element is present throughout the carrier or just on its surface. Note that the scale for the elements on the left of the linescan graphs is much smaller than the scale for the elements on the right of the linescan graphs.

Example 11

Activity Testing of Catalysts Containing Co, Mo, and P

Catalysts prepared as described in Example 8 were ground; powder fractions of 125 to 310 µm were isolated by sieving. The 125 to 310 µm fractions were evaluated for their performance in hydrodesulfurization and hydrodenitrogenation. The catalysts were sulfided by contacting them with dimethyl disulfide (2.5 wt % S) spiked straight run gas oil (SRGO) just prior to running the test; the pre-sulfiding conditions are set forth in the Table 8A. Catalyst testing was performed using a high-throughput test unit (HTU). An SRGO feed having a density of 0.849 g/mL at 15° C., a sulfur content of 13713 ppm, and a nitrogen content of 121 ppm was used for testing. The different conditions that were used for testing are set forth in Table 8B.

TABLE 8A

| Presulfiding condition | Feed | P, bar | LHSV,* 1/hr | $H_2$/oil, NL/L | Rxn T, start | Rxn T, end | Rxn T, ramp | Time |
|---|---|---|---|---|---|---|---|---|
| A | 2099 | 45 | 3 | 300 | 50° C. | 65° C. | 10° C./hr | 24 hr |
| B | 2099 | 45 | 3 | 300 | 65° C. | 250° C. | 34.3° C./hr | 7.6 hr |
| C | 2099 | 45 | 3 | 300 | 250° C. | 320° C. | 20° C./hr | 8.5 hr |

*LHSV is the liquid hourly space velocity.

TABLE 8B

| Test condition | P, bar | WHSV,[1] 1/hr | Ha/oil, NL/L | T | TOS,[2] days | nHDS[3] | nHDN[3] |
|---|---|---|---|---|---|---|---|
| 1 | 45 | 5.25 | 200 | 315° C. | 3.0 | 1.3 | 1.0 |
| 2 | 45 | 4.76 | 200 | 350° C. | 6.7 | 1.2 | 1.0 |
| 3 | 30 | 1.73 | 200 | 350° C. | 9.7 | 1.1 | 1.0 |

[1]WHSV is the weight hourly space velocity.
[2]TOS is time on stream.
[3]Reaction orders for hydrodesulfurization (HDS) and hydrodenitrogenation (HDN).

Several periodic drains (samples) were taken during each test condition. Table 9 sets forth the average S and N numbers at each test condition, which are averages of several samples, as well as the relative weight activity (RWA) of the different catalysts based on the reaction orders given in Table 8B. In Table 9, the HDS and HDN activities on a weight basis demonstrate that polyacrylamide-containing catalysts perform even better than polyacrylic acid-containing catalysts. A comparison of catalysts C2 and 5 clearly shows that polyacrylamide provides a higher catalyst activity for HDS and HDN than polyacrylic acid when the catalysts are otherwise the same. The observed activity increase is about 15% or more RWA HDS when 20 wt % polymer is present relative to the total (dry) weight of the catalyst, where the total weight of the catalyst includes the $MoO_3$, CoO, and $P_2O_5$.

TABLE 9

| | | Catalyst | | | | | |
|---|---|---|---|---|---|---|---|
| Catalyst features | | C1 | C2 | C3 | 4 | 5 | 6 |
| | | | 20 wt % AA (2 step) | 10 wt % AA | 20 wt % AAM | 20 wt % AAM (2 step) | 10 wt % AAM |
| Catalyst loaded | | 0.7 g | 0.66 g | 0.7 g | 0.63 g | 0.67 g | 0.69 g |
| ppm S | Cond 1 | 3089 | 2912 | 2901 | 2546 | 2350 | 2780 |
| | Cond 2 | 420 | 344 | 337 | 219 | 197 | 298 |
| | Cond 3 | 108.9 | 85.1 | 71 | 38.8 | 33.9 | 61.3 |
| RWA HDS | Cond 1 | 100% | 110% | 105% | 128% | 128% | 109% |
| | Cond 2 | 100% | 114% | 109% | 140% | 138% | 116% |
| | Cond 3 | 100% | 112% | 111% | 141% | 137% | 117% |
| ppm N | Cond 1 | 89.9 | 87.6 | 88.4 | 80.5 | 79.1 | 85.1 |
| | Cond 2 | 39.6 | 31.8 | 31.3 | 19.3 | 18.1 | 29.8 |
| | Cond 3 | 28.7 | 22.1 | 18.9 | 13.6 | 12.9 | 20.5 |
| RWA HDN | Cond 1 | 100% | 114% | 105% | 150% | 148% | 119% |
| | Cond 2 | 100% | 126% | 121% | 126% | 178% | 127% |
| | Cond 3 | 100% | 124% | 129% | 124% | 161% | 125% |

Example 12

Activity Testing of Catalysts Containing Co, Mo, and P

Catalysts prepared as described in Example 9 were ground; powder fractions of 125 to 310 µm were isolated by sieving. The 125 to 310 µm fractions were evaluated for their performance in hydrodesulfurization and hydrodenitrogenation. The catalysts were sulfided by contacting them with dimethyl disulfide (2.5 wt % S) spiked straight run gas oil (SRGO) just prior to running the test; the pre-sulfiding conditions are set forth in the Table 10A. Catalyst testing was performed using a high-throughput test unit (HTU). An SRGO feed having a density of 0.8547 g/mL at 15° C., a sulfur content of 13880 ppm, and a nitrogen content of 212 ppm was used for testing. The different conditions that were used for testing are set forth in Table 10B.

TABLE 10A

| Presulfiding condition | Feed | P, bar | LHSV,* 1/hr | H₂/oil, NL/L | Rxn T, start | Rxn T, end | Rxn T, ramp | Time |
|---|---|---|---|---|---|---|---|---|
| A | 1985 C7 | 45 | 3 | 300 | 50° C. | 65° C. | 30° C./hr | 12 hr |
| B | 2099 | 45 | 3 | 300 | 65° C. | 250° C. | 30° C./hr | 8 hr |
| C | 2099 | 45 | 3 | 300 | 250° C. | 320° C. | 20° C./hr | 5 hr |

*LHSV is the liquid hourly space velocity.

TABLE 10B

| Test condition | P, bar | WHSV,[1] 1/hr | H₂/oil, NL/L | T | TOS,[2] days | nHDS[3] | nHDN[3] |
|---|---|---|---|---|---|---|---|
| 1 | 45 | 3.40 | 300 | 350°C | 6.0 | 1.2 | 1.0001 |
| 2 | 45 | 2.18 | 300 | 350°C | 9.8 | 1.15 | 1.0001 |

[1]WHSV is the weight hourly space velocity.
[2]TOS is time on stream.
[3]Reaction orders for hydrodesulfurization (HDS) and hydrodenitrogenation (HDN).

Several periodic drains (samples) were taken during each test condition. Table 11 sets forth the average S and N numbers at each test condition, which are averages of several samples, as well as the relative weight activity (RWA) of the different catalysts. In these runs, the RWAs from the runs using polymer-containing catalysts are given relative to the RWAs from the runs using DEG-containing catalysts, which were normalized to 100%. The results reported tin Table 11 show that for a specified carrier surface area, polyacrylamide-containing catalysts perform better than DEG-containing catalysts, and that polyacrylamide-containing catalysts perform better on carriers with lower surface areas. The weight of the catalysts is on a dry basis, and the total weight of the catalyst includes the MoO₃, CoO, and P₂O₅.

TABLE 11

| Catalyst | | C7 | 8 | C9 | 10 |
|---|---|---|---|---|---|
| Catalyst features | | 11 wt % DEG 186 m²/g | 18 wt % AAM 186 m²/g | 11 wt % DEG 271 m²/g | 19 wt % AAM 271 m²/g |
| Catalyst loaded | | 0.65 g | 0.65 g | 0.64 g | 0.61 g |
| ppm S | Cond 1 | 355 | 220 | 238 | 206 |
| | Cond 2 | 155.3 | 50.2 | 87.1 | 61.2 |
| RWA HDS | Cond 1 | 100% | 120% | 100% | 110% |
| | Cond 2 | 100% | 138% | 100% | 115% |
| ppm N | Cond 1 | 80.5 | 48.9 | 65 | 53.5 |
| | Cond 2 | 34.8 | 5.1 | 22.4 | 11.2 |
| RWA HDN | Cond 1 | 100% | 152% | 100% | 122% |
| | Cond 2 | 100% | 207% | 100% | 137% |

Example 13

Activity Testing of Catalysts Containing Co, Mo, and P

Catalysts prepared as described in Example 10 were ground; powder fractions of 125 to 310 μm were isolated by sieving. The 125 to 310 μm fractions were evaluated for their performance in hydrodesulfurization and hydrodenitrogenation. The catalysts were sulfided just prior to running the test as described in Example 9; the pre-sulfiding conditions are set forth in the Table 10A above. Catalyst testing was performed as described in Example 12; the different conditions that were used for testing are set forth in Table 10B.

Several periodic drains (samples) were taken during each test condition. Table 12 sets forth the average S and N numbers at each test condition, which are averages of several samples, as well as the relative weight activity (RWA) of the different catalysts. In these runs, the RWAs from the runs using polymer-containing catalysts are given relative to the RWAs from the runs using DEG-containing catalysts, which were normalized to 100%. The results reported in Table 12 show that the higher activity of polyacrylamide-containing catalysts is retained when mixed oxide supports are used. Particularly high catalyst activities were found when the catalyst carrier was a TiO₂—Al₂O₃ carrier. The weight of the catalysts is on a dry basis, and the total weight of the catalyst includes the MoO₃, CoO, and P₂O₅.

TABLE 12

| | | Catalyst | | | | | | | |
|---|---|---|---|---|---|---|---|---|---|
| | | C11 | 12 | C13 | 14 | C15 | 16 | C17 | 18 |
| Catalyst features | | DEG SiO₂ 348 m²/g | AAM SiO₂ 348 m²/g | DEG SiO₂ 260 m²/g | AAM SiO₂ 260 m²/g | DEG B₂O₃ 252 m²/g | AAM B₂O₃ 252 m²/g | DEG TiO₂ 268 m²/g | AAM TiO₂ 268 m²/g |
| Catalyst loaded | | 0.71g | 0.68 g | 0.64 g | 0.64 g | 0.66 g | 0.66 g | 0.7 g | 0.69 g |
| ppm S | Cond 1 | 166 | 171 | 169 | 141 | 176 | 113 | 225 | 159 |
| | Cond 2 | 48 | 49.8 | 21.9 | 20.8 | 28.2 | 16.2 | 65.9 | 26.6 |
| RWA HDS | Cond 1 | 100% | 104% | 100% | 108% | 100% | 116% | 100% | 126% |
| | Cond 2 | 100% | 104% | 100% | 103% | 100% | 115% | 100% | 135% |
| ppm N | Cond 1 | 51.4 | 53.4 | 22.8 | 15.4 | 33 | 12.8 | 43 | 28.9 |
| | Cond 2 | 12.9 | 13.9 | <2.0 | <2.0 | <2.0 | <2.0 | 3.5 | <2.0 |
| RWA HDN | Cond 1 | 100% | 103% | 100% | 120% | 100% | 151% | 100% | 139% |
| | Cond 2 | 100% | 102% | 100% | — | 100% | — | 100% | — |

Examples 14-15

The catalysts in these runs were prepared using the one-step impregnation method described above in Example 9: an impregnation solution containing cobalt, molybdenum, and phosphorus was prepared by mixing together cobalt carbonate $(Co(OH)_x(CO_3)_y)$, $MoO_3$, $H_3PO_4$ (aq., 85%), and water in appropriate amounts. The mixture was heated at temperatures above 70° C. until a clear solution was obtained. No monomer was present in this solution. The solution was added to a quadrilobed shaped alumina support via pore volume impregnation, and the resulting catalyst was subsequently dried. The catalyst contained 23.7 wt % $MoO_3$, 4.6 wt % CoO, and 2.0 wt % $P_2O_5$ on $Al_2O_3$. A portion of the catalyst was used in each of the impregnation experiments in Examples 14 and 15.

Example 14

In this experiment, an aqueous solution containing acrylamide and potassium persulfate was mixed with a portion of the catalyst prepared above. The flask containing the catalyst mixture was heated and dried as described in Example 8 above. The final catalyst was a free-flowing powder that was light brown in color.

Example 15—Comparative

An aqueous solution of polyacrylamide was made and added to the CoMoP—$Al_2O_3$ catalyst. The polyacrylamide had a molecular weight of 40,000, and was obtained commercially from Sigma Aldrich Company. The target loading of polymer was 20 wt % with respect to the combined weight of $Al_2O_3+MoO_3+CoO+P_2O_5$ (excluding water). For example, 5.55 grams of catalyst with a water content of 10% corresponds to ~5 grams of catalyst excluding water; the target polymer loading for such a catalyst is 1 gram. The concentration of the aqueous solution containing 1 gram of polyacrylamide was adjusted to result in a pore volume impregnation, i.e. to not overfill the pores. After addition of the aqueous polymer solution to the dry catalyst, the material was aged at 40° C. for 2 hours to make the material homogeneous, and then the catalyst was dried at 120° C. The final material was red in color, the catalyst particles appeared to be glued together, and there was a glassy material on the surface of the particles. The red color of the glassy material on the catalyst particles may be caused by the presence of cobalt on the outside of the catalyst particles.

Both the monomer impregnated catalyst of Example 14 and the polymer-contacted catalyst of Example 15 were subjected to scanning electron microscopy energy-dispersive x-ray spectroscopy (SEM-EDX) to map the location of various elements in the catalyst particles. The catalysts were placed in a carbon matrix (embed resin) for these scans. Cross sections of the quadrilobed particles are shown in FIGS. 4-1 to 4-5.

Figure 4:
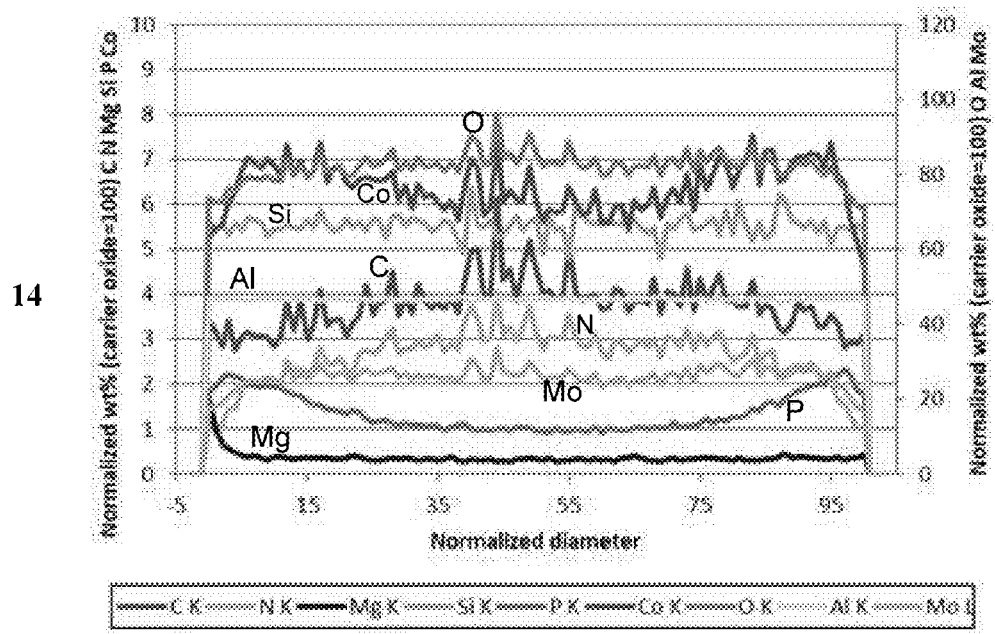
Figures 3, 4, 5:
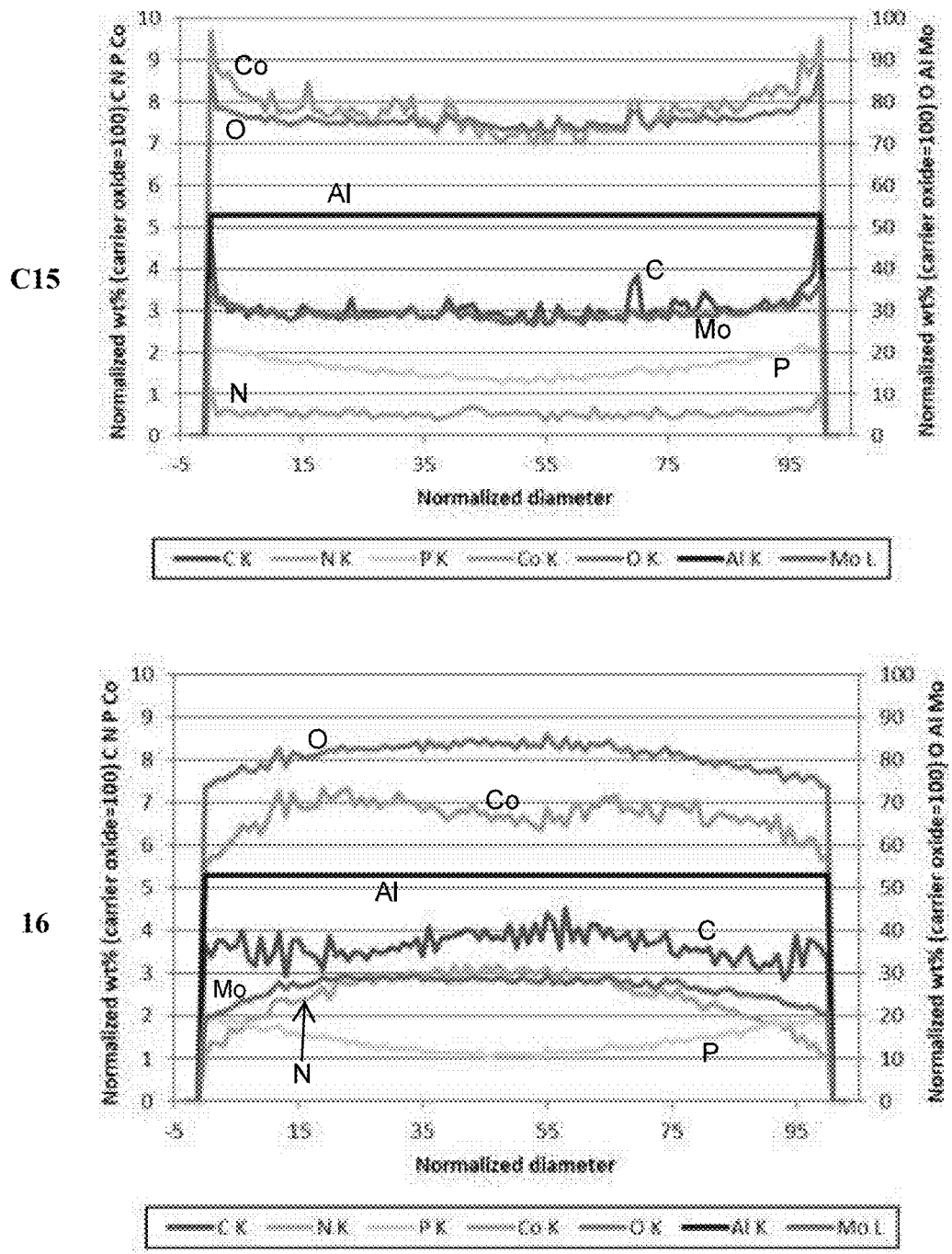
Figures 1, 4:
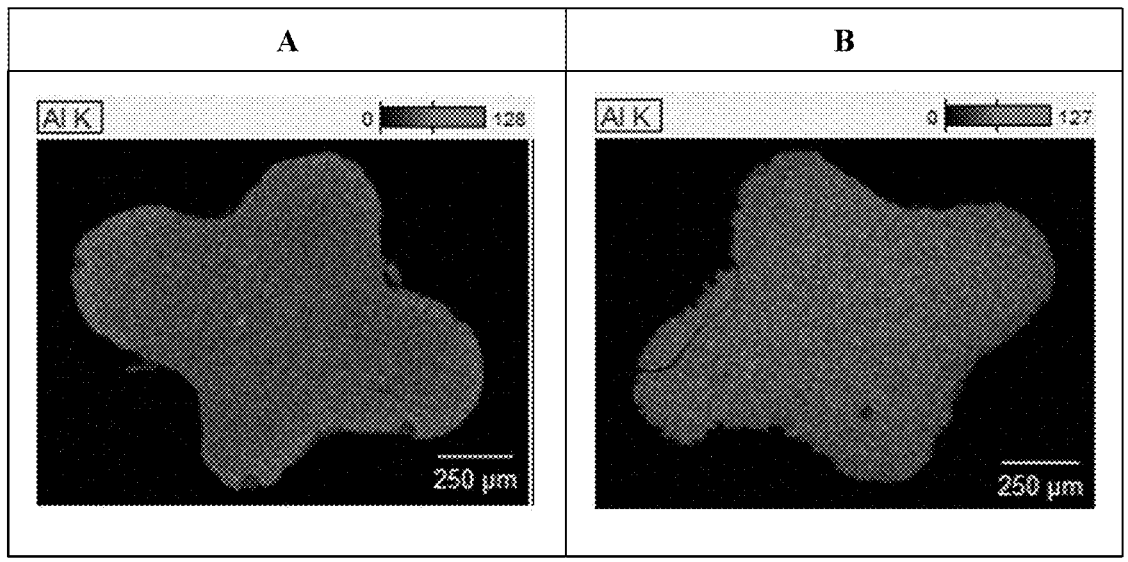
Figures 2, 4:
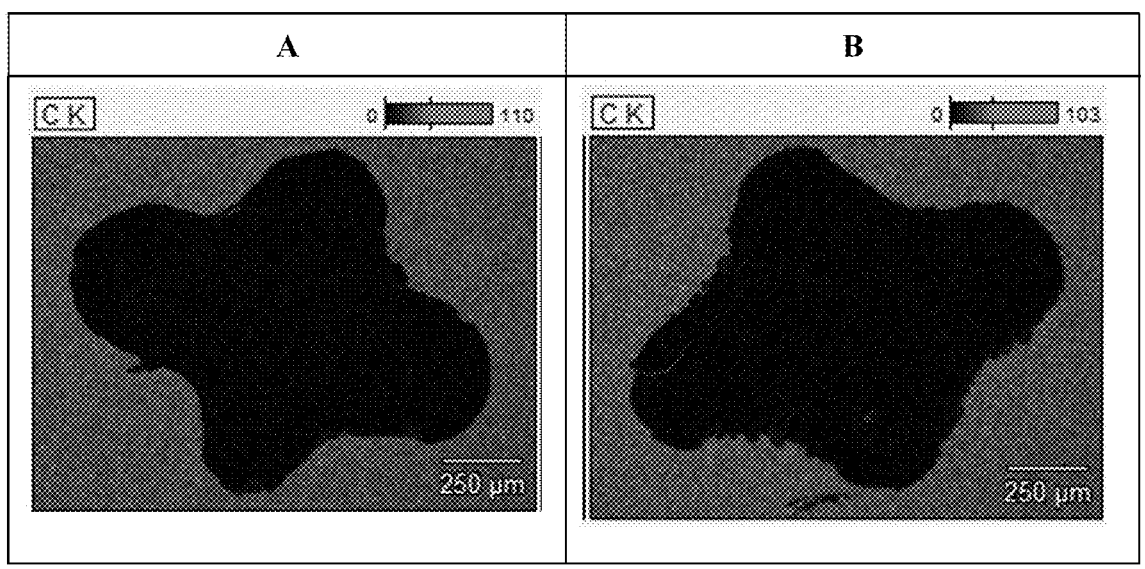
Figures 3, 4:
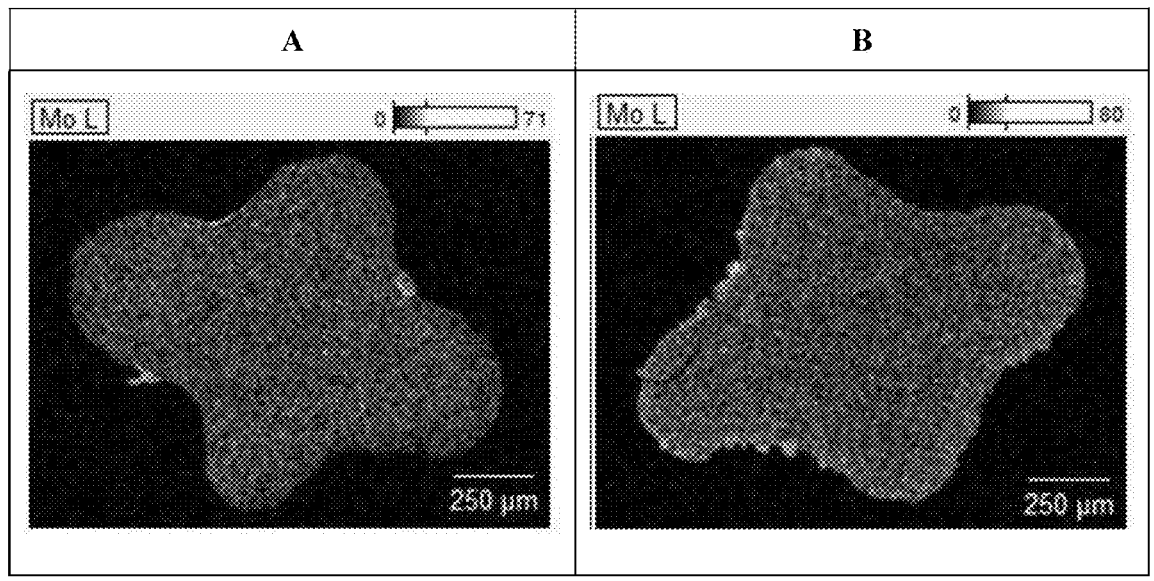
Figure 4:
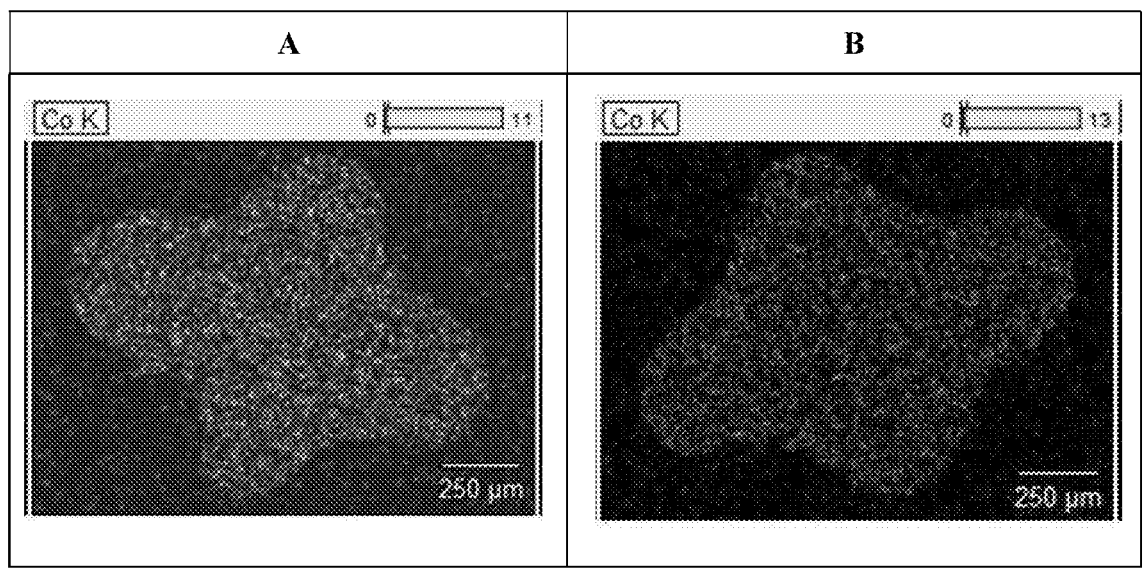
Figures 4, 5:
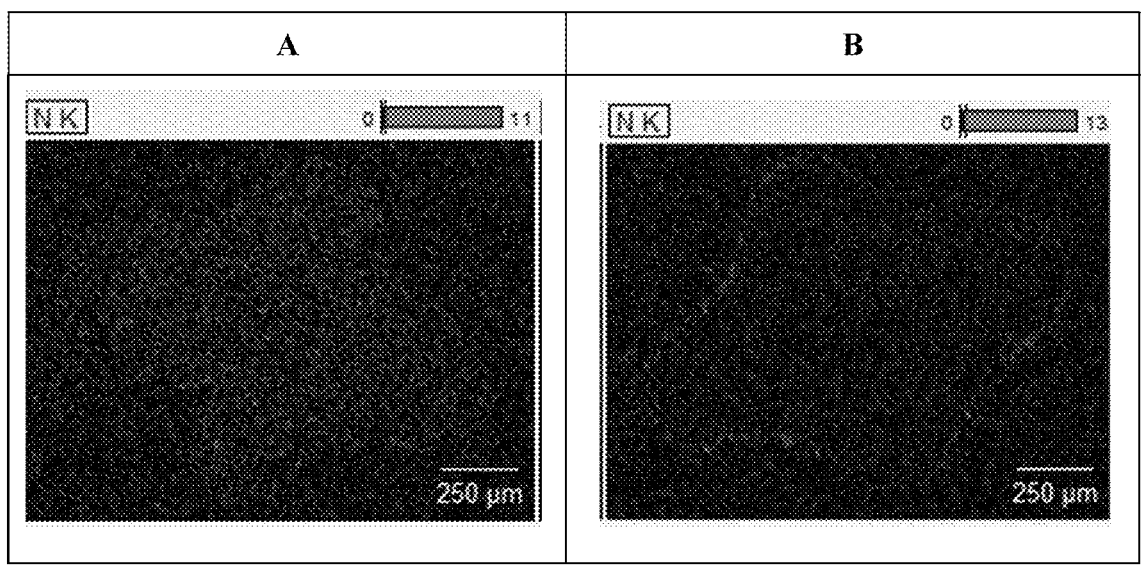
Figure 5:
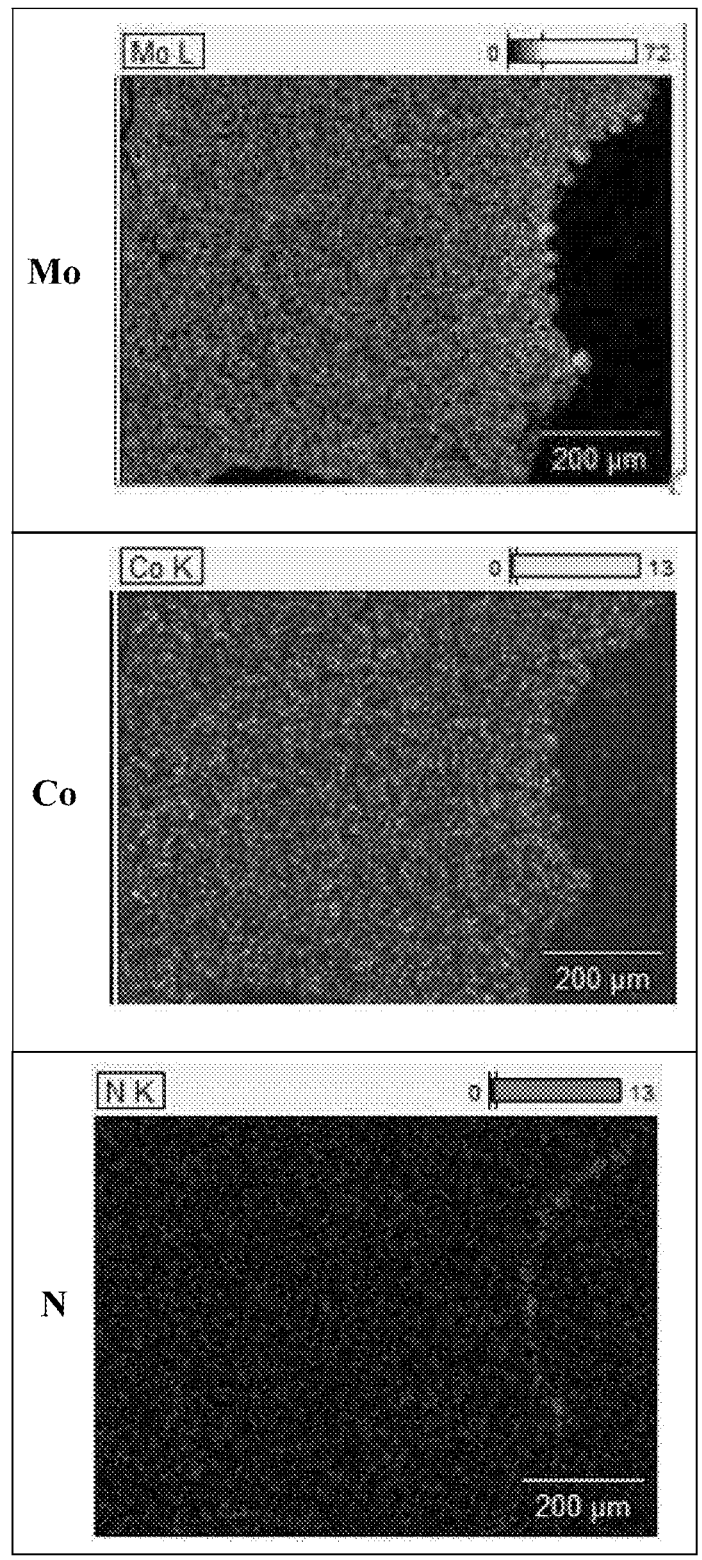

In FIGS. 4-1 to 4-5, side-by-side comparisons of the SEM-EDX results are shown; the A column is for the monomer-impregnated catalyst of Example 14, and the B column is for the polymer-contacted catalyst of Example 15. Because the support material is $Al_2O_3$, the aluminum signal is quite strong (FIG. 4-1). The quadrilobed shape of the catalyst particles can be seen in the images for both catalysts. The carbon signals (FIG. 4-2) are quite strong around the particles because they are in a carbon matrix. The carbon cross sections show no signal from either catalyst particle type because the amount of carbon in the particles is much lower than in the carbon matrix.

The molybdenum cross sections of the catalyst particles (FIG. 4-3) are fainter because the amount of molybdenum is low relative to the amounts of aluminum and oxygen, resulting in a lower signal-to-noise ratio. For the polymer-contacted catalyst particle (B), the molybdenum cross section shows nodules around the edges of the quadrilobed shape of the particle, indicating that some of the molybdenum is on the outside of the particle. These nodules are not artifacts because the carbon cross section of the polymer-contacted catalyst particle (B) in FIG. 4-2 clearly shows nodules in the same location. The cobalt cross sections (FIG. 4-4) have an even lower signal-to-noise ratio than the molybdenum cross sections because the amount of cobalt is lower than the amount of molybdenum. For the monomer-impregnated catalyst particle (A), the cobalt cross section is of the same shape as the cross sections for aluminum and carbon. Similar to the cobalt cross sections, the nitrogen cross sections (FIG. 4-5) have an even lower signal-to-noise ratio because the amount of nitrogen is lower than the amount of cobalt. For the monomer-impregnated catalyst particle (A), the nitrogen cross section is of the same shape as the cross sections for aluminum and carbon, and shows a uniform distribution of the nitrogen signal. In the comparative polymer-impregnated catalyst particle (B), the nitrogen signal is stronger around the perimeter pf the catalyst particle, suggesting that polyacrylamide is attached to the outside of the catalyst particle.

FIG. 5 shows enlargements of a portion of the cross sections of the edge of the polymer-contacted catalyst particle of Example 15. In these cross sections, nodules on the perimeter of the particle are visible. The nitrogen cross section indicates that these nodules are comprised of polyacrylamide. The enlarged cobalt and molybdenum cross sections show that the nodules of polymer-impregnated catalyst particles have a cobalt signal and a molybdenum signal. This indicates that some of the cobalt and molybdenum migrated (leached) out into the polyacrylamide that is outside of the catalyst particles. This migration of cobalt and molybdenum is generally undesirable, because homogenous distribution of the metals in the catalyst particle is usually desired.

Examples 16-18

The catalysts in these runs were prepared using the one-step impregnation method described above, and polyacrylic acid was used instead of acrylic acid monomer to determine whether polyacrylic acid with very low molecular weight could be incorporated into the pore structure of $Al_2O_3$. In all three Examples, the $Al_2O_3$ support had a pore volume of 0.80 mL/g.

Example 16—Comparative

A polyacrylic acid (PAA) solution was made which upon pore volume impregnation of the $Al_2O_3$ support would result in a polymer concentration in the final catalyst of approximately 7 wt %. In 50 mL $H_2O$, 6.11 g of polyacrylic acid (mw 450; Sigma Aldrich) were dissolved ($c_{PAA}$=0.12 g/mL) by adding the PAA slowly while stirring at a temperature of 40 to 50° C. After all of the PAA had dissolved, a viscous solution with a pH of 1.9 was obtained. The pH was increased to 5.3 by adding NaOH (which in effect resulted in the formation of Na polyacrylate). Upon addition of the NaOH, the solution became even more viscous. It became clear that PAA solutions in water are highly viscous even at low concentrations, regardless of the presence of sodium. The viscous solution (gel) was brought into contact with the $Al_2O_3$, which remained on top of the gel without any imbibition of the solution (gel) into the pores. As it became obvious that impregnation was not going to occur, the experiment was halted and not all of the Al$_2$O$_3$ was added to the solution (gel). Results are summarized in Table 13.

Example 17—Comparative

A PAA solution was made which upon pore volume impregnation of the Al$_2$O$_3$ support would result in a polymer concentration in the final catalyst of about 1 wt %. In 50 mL of distilled water, 1.0 g of PAA (mw 1250, Sigma Aldrich) was dissolved ($c_{PAA}$=0.02 g/mL) by adding the PAA while stirring at a temperature of about 50° C.; the solution immediately became viscous when PAA was added to the heated water. The solution (gel) was brought into contact with Al$_2$O$_3$, which remained on top of the gel without any imbibition of the solution (gel) into the pores. As it became obvious that impregnation was not going to occur, the experiment was halted and not all Al$_2$O$_3$ was added to the solution (gel). Results are summarized in Table 13.

Example 18—Comparative

Acrylic acid monomer was used in this experiment, and the concentration of acrylic acid, upon pore volume impregnation of the Al$_2$O$_3$ support, would result in a polymer concentration in the final catalyst of approximately 23 wt %, a much higher concentration than was used in Examples 16 and 17. In 50 mL of distilled water, 20.50 g acrylic acid and 0.50 g ammonium persulfate were dissolved ($c_{AA}$=0.41 g/mL). The ammonium persulfate was an initiator for the polymerization. This solution was not viscous. The monomer-containing solution was heated to a temperature of >80° C. to initiate the polymerization of acrylic acid to PAA. Upon polymerization, gel formation occurred rapidly, similar to the PAA solutions (gels) obtained in Examples 16 and 17. Results are summarized in Table 13.

TABLE 13

| Ex. | PAA mw | Expected amount PAA in catalyst | Result |
|---|---|---|---|
| 16 | 450 | 7 wt % | gel - no impregnation |
| 17 | 1250 | 1 wt % | gel - no impregnation |
| 18 | Before polym. | 23 wt % | soln. - impregnation possible |
|    | After polym. | 23 wt % | gel - no impregnation |

In Examples 16-18, the impregnations were pore volume impregnation or incipient wetness impregnation, in which, as noted above, the impregnation solution will be taken up virtually completely by the pores of the catalyst support. If impregnation had worked in Examples 16-18, all of the solution would have gone into the pores. The fact that the solutions remained indicates that there was minimal or no uptake of polymer into the pores of the Al$_2$O$_3$ support.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A supported catalyst comprising a carrier, phosphorus, at least one Group VI metal, at least one Group VIII metal, and a polymer, where
    the molar ratio of phosphorus to Group VI metal is about 1:1.5 to less than about 1:12,
    the molar ratio of the Group VI metal to the Group VIII metal is about 1:1 to about 5:1, and
    the polymer has a carbon backbone and comprises an amido group.

2. A supported catalyst as in claim 1 wherein:
    said carrier is carbon, carbon in combination with one or more inorganic oxides, boria, titania, silica, alumina, silica-alumina, alumina with silica-alumina dispersed therein, alumina-coated silica, silica-coated alumina, alumina containing boron, alumina containing silicon, alumina containing titanium, or a combination of any two or more of these;
    the polymer is polyacrylamide, polymethacrylamide, poly(N-isopropyl)acrylamide, poly(N-hydroxymethyl)acrylamide, poly(N-hydroxyethyl)acrylamide, poly(N-methoxymethyl)acrylamide, poly(N-ethoxymethyl)acrylamide, or a co-polymer of any two or more of the foregoing; and/or said Group VI metal is molybdenum and/or tungsten, and/or wherein said Group VIII metal is nickel and/or cobalt.

3. A supported catalyst as in claim 2 wherein the carrier is carbon, or alumina containing boron, alumina containing silicon, and/or alumina containing titanium.

4. A supported catalyst as in claim 1 wherein the polymer is polyacrylamide.

5. A supported catalyst as in claim 1 wherein the molar ratio of phosphorus to Group VI metal is about 1:2.5 to less than about 1:12, and/or wherein the catalyst has a polymer loading of about 1.5 wt % or more, relative to the total weight of the carrier, Group VI metal, Group VIII metal, and phosphorus, where the Group VI metal, Group VIII metal, and phosphorus are expressed as their oxides.

6. A supported catalyst as in claim 1 which has an average particle size of about 0.5 mm to about 5 mm.

7. A supported catalyst as in claim 1 wherein the carrier is about 40 wt % to about 80 wt % relative to the total weight of the carrier, Group VI metal, Group VIII metal, and phosphorus, where the Group VI metal, Group VIII metal, and phosphorus are expressed as their oxides.

8. A method for hydrotreating, hydrodenitrogenation, and/or hydrodesulfurization, which method comprises contacting a hydrocarbon feed and a supported catalyst of claim 1.

9. A process for forming a supported catalyst, which process comprises
I) bringing together a carrier, one or more monomer species, a solvent, at least one phosphorus compound, at least one Group VI metal compound, and at least one Group VIII metal compound, in any of the following combinations:
  a) a carrier, one or more monomer species, and a solvent,
  b) a carrier, one or more monomer species, at least one phosphorus compound, at least one Group VI metal compound, and at least one Group VIII metal compound, or
  c) a carrier and an impregnation solution, forming an impregnated carrier, followed by mixing the impregnated carrier with one or more monomer species,
  to form a monomer-containing mixture, where said one or more monomer species is soluble in the solvent and has carbon-carbon unsaturation and an amido group; and
II) initiating polymerization of at least a portion of said one or more monomer species in the monomer-containing mixture to form a polymerized product;
III) when the monomer-containing mixture in I) is formed as in a), either
  A) contacting an impregnation solution and the monomer-containing mixture during the polymerization in II), or
  B) contacting the polymerized product and an impregnation solution;
to form a supported catalyst, where the molar ratio of phosphorus to Group VI metal is about 1:1.5 to less than about 1:12, where the molar ratio of the Group VI metal to the Group VIII metal is about 1:1 to about 5:1, and where said impregnation solution comprises a solvent, phosphorus, at least one Group VI metal, and at least one Group VIII metal.

10. A process as in claim 9 further comprising
removing excess solvent from the supported catalyst; and/or
sulfiding the supported catalyst.

11. A process as in claim 10 wherein the polymerizing is carried out during removal of excess solvent.

12. A process as in claim 9 wherein a single impregnation step is carried out
  a) in I) when bringing together a carrier, one or more monomer species, at least one phosphorus compound, at least one Group VI metal compound, and at least one Group VIII metal compound;
  b) in I), when bringing together a carrier and an impregnation solution; or
  c) in III).

13. A process as in claim 9 wherein the monomer-containing mixture in I) is formed as in b).

14. A process as in claim 13 wherein:
said solvent is water;
said phosphorus compound is a water soluble acidic phosphorus compound;
said Group VI metal compound is an oxide or an oxo-acid; and/or
said Group VIII metal compound is a carbonate, hydroxide, or hydroxy-carbonate.

15. A process as in claim 14 wherein said Group VI metal compound is a molybdenum compound and/or a tungsten compound, and/or wherein said Group VIII compound is a nickel and/or cobalt compound.

16. A process as in claim 9 wherein:
the monomer species is acrylamide, methacrylamide, N-isopropylacrylamide, N-hydroxymethyl acrylamide, N-hydroxyethyl acrylamide, N-methoxymethyl acrylamide, N-ethoxymethyl acrylamide; and/or
said carrier is carbon, boria, titania, silica, alumina, silica-alumina, alumina with silica-alumina dispersed therein, alumina-coated silica, silica-coated alumina, alumina containing boria, and/or alumina containing titania.

17. A process as in claim 9 wherein the monomer species is acrylamide.

18. A process as in claim 9 wherein the molar ratio of phosphorus to Group VI metal is about 1:2.5 to less than about 1:12, and/or wherein the monomer species is in an amount of about 1.5 wt % or more, relative to the total weight of the carrier, Group VI metal compound, Group VIII metal compound, and phosphorus compound, where the Group VI metal compound, Group VIII metal compound, and the phosphorus compound are expressed as oxides.

19. A process as in claim 9 wherein a chemical substance is employed as an initiator, and wherein the chemical substance comprises a persulfate salt.

20. A process as in claim 9 wherein the carrier has been calcined and/or extruded prior to step I) of the process.

21. A process as in claim 20 wherein the carrier is alumina containing boron, alumina containing silicon, alumina containing titanium, or a combination of any two or more of these.

22. A process as in claim 21 wherein said Group VI metal is molybdenum and/or tungsten, and/or wherein said Group VIII compound is nickel and/or cobalt.

23. A method for hydrotreating, hydrodenitrogenation, and/or hydrodesulfurization, which method comprises contacting a hydrocarbon feed and a supported catalyst of claim 22.

24. A process as in claim 9 wherein the carrier has an average particle size of about 0.5 mm to about 5 mm, and wherein the supported catalyst has an average particle size of about 0.5 mm to about 5 mm.

25. A supported catalyst formed as in claim 9.

26. A supported catalyst as claim 25 wherein:
the catalyst has an average particle size of about 0.5 mm to about 5 mm; and/or
the carrier is about 40 wt % to about 80 wt % relative to the total weight of the carrier, Group VI metal, Group VIII metal, and phosphorus, where the Group VI metal, Group VIII metal, and phosphorus are expressed as their oxides.

* * * * *